US008589132B2

(12) United States Patent
Miyagi et al.

(10) Patent No.: US 8,589,132 B2
(45) Date of Patent: Nov. 19, 2013

(54) METHOD, DEVICE, PROGRAM, AND RECORDING MEDIUM OF ANALYZING CAUSE OF SPRINGBACK

(75) Inventors: Takashi Miyagi, Tokyo (JP); Yasuharu Tanaka, Tokyo (JP); Misao Ogawa, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 220 days.

(21) Appl. No.: 13/132,637

(22) PCT Filed: Jun. 24, 2009

(86) PCT No.: PCT/JP2009/061474

§ 371 (c)(1),
(2), (4) Date: Jun. 3, 2011

(87) PCT Pub. No.: WO2010/073756

PCT Pub. Date: Jul. 1, 2010

(65) Prior Publication Data

US 2011/0246150 A1  Oct. 6, 2011

(30) Foreign Application Priority Data

Dec. 25, 2008 (JP) ................ P2008-329099

(51) Int. Cl.
*G06F 7/48* (2006.01)
(52) U.S. Cl.
USPC ........... 703/7; 703/1; 700/98; 702/33; 702/42
(58) Field of Classification Search
USPC ................ 703/1, 7; 700/98; 702/33, 42
See application file for complete search history.

(56) References Cited

U.S. PATENT DOCUMENTS

| 6,035,242 | A * | 3/2000 | Uemura et al. ............... 700/97 |
| 6,522,979 | B1 * | 2/2003 | Yavari et al. ................. 702/42 |
| 7,395,128 | B2 * | 7/2008 | Zhu et al. ..................... 700/97 |
| 2008/0004850 | A1 * | 1/2008 | Wang ............................. 703/13 |
| 2010/0005845 | A1 * | 1/2010 | Yoshida et al. ............. 72/31.01 |
| 2010/0241366 | A1 * | 9/2010 | Nonomura et al. ............ 702/42 |

FOREIGN PATENT DOCUMENTS

| JP | 2003-33828 A | 2/2003 |
| JP | 2004-148381 A | 5/2004 |
| JP | 2007-229724 A | 9/2007 |

(Continued)

OTHER PUBLICATIONS

"Sheet Metal Forming Analyses With an Emphasis on the Springback Deformation", Firat, et. al., Journal of Materials Processing Technology, vol. 196, Issues 1-3, Jan. 21, 2008, pp. 135-148.*

(Continued)

*Primary Examiner* — Kamini S Shah
*Assistant Examiner* — Nabil A Adawi, Jr.
(74) *Attorney, Agent, or Firm* — Birch, Stewart, Kolasch & Birch, LLP

(57) ABSTRACT

A method of analyzing a cause of springback of the invention includes: performing a forming analysis to calculate forming data of a formed product; decomposing a component into an in-plane stress component and a bending moment component; generating a before-calculation individual decomposition forming data; performing a calculation to generate an after-calculation individual decomposition forming data; analyzing a first springback configuration and a second springback configuration; obtaining a degree of influence of a stress in each of the areas with respect to springback deformation; and displaying the degree of influence with respect to the springback deformation.

10 Claims, 17 Drawing Sheets

(56) References Cited

FOREIGN PATENT DOCUMENTS

| | | | |
|---|---|---|---|
| JP | 2008-49389 A | | 3/2008 |
| JP | 2008-55476 A | | 3/2008 |
| RU | 2006135604 A | | 4/2008 |
| RU | 2007105425 A | | 8/2008 |
| SU | 296023 | | 2/1971 |
| SU | 1021983 A | | 6/1983 |
| WO | WO2008/026716 | * | 3/2008 |

OTHER PUBLICATIONS

"An effective analytical model for springback prediction in straight flanging processes", Thaweepat Buranathiti and Jian Cao, Int. J. Materials and Product Technology, vol. 21, Nos. 1/2/3, 2004, pp. 137-153.*

"Improvement of Springback Prediction in Sheet Metal Forming", I.A. Burchitz, Apr. 2008, pp. 1-156.*

"Advances in experiments on metal sheets and tubes in support of constitutive modeling and forming simulations", Toshihiko Kuwabara, International Journal of Plasticity, vol. 23, Issue 3, Mar. 2007, pp. 385-419.*

Decision on Grant for Russian Application No. 2011125636/02 dated Oct. 9, 2012.

International Search Report for PCT/JP2009/061474 for Aug. 11, 2009.

K. Matsuyama et al., "Latest Stamping Simulation Technique", Mitsubishi Motors Corporation technical review, 2006, No. 18, pp. 126-131.

* cited by examiner

METHOD, DEVICE, PROGRAM, AND RECORDING MEDIUM OF ANALYZING CAUSE OF SPRINGBACK

TECHNICAL FIELD

The present invention relates to a method, a device, a program, and a recording medium of analyzing a cause of springback in a formed product that is press-formed from a steel plate or other metal plates into parts of automobiles or household appliances. Although the invention will be described with reference to a steel plate, the invention may also be applied to other metal plates, plastic plates and linear materials.

Priority is claimed on Japanese Patent Application No. 2008-329099, filed Dec. 25, 2008, the content of which are incorporated herein by reference.

BACKGROUND ART

Many parts of automobiles, such as doors and bumpers, or household appliances, such as refrigerator panels, are press-formed from a steel plate or other metal plates. There is an increasing demand for lightweight press-formed products. Therefore, high-strength steel plates are used to provide thin and lightweight products. High-strength steel plates, however, have greater deformation resistance, which may increase the likelihood of occurrence of springback caused by residual stress during the process of press-forming.

There is a recent trend that a forming process planning for forming products is started at the same time as a design stage of automobiles or the like; in order to reduce development man-hours and manufacturing costs. In order to follow the trend, a configuration of a press-formed product and its forming data are analyzed by a computer. The analysis provides calculation of a springback amount of the press-formed product estimated from the residual stress after the forming. The die configuration is corrected in accordance with the calculated springback amount.

Patent Document 1 and Non Patent Document 1 disclose a method of determining a die configuration by estimating springback as described above. In particular, residual stress in a steel plate pressed in a die at the press bottom dead center is analyzed by a finite element method, and a die having a configuration of deformation (i.e., spring forward) caused by a residual stress toward the direction opposite to the aforementioned residual stress is numerically analyzed. In this manner, a die configuration which addresses the problem of springback can be obtained easily.

However, it is very difficult to design a die through numerical analysis taking the problem of the springback into consideration in a complete manner, because it is a nonlinear problem. The methods in the foregoing documents are proposed only to obtain a simple die which is designed taking a consideration of springback by the finite element method. The documents therefore suggest no countermeasures against a product obtained by press-forming in a die that is outside of the tolerance for springback, which is a phenomenon that is difficult to analyze numerically.

If a formed product which satisfies the tolerance value for the springback cannot be obtained using a die designed considering the springback problem, countermeasures to be undertaken must be determined by experienced technical personnel. Accordingly, there is a need to produce an actual die and to repeatedly modify the die configuration while pressing steel plates in the die.

Another approach to reduce the springback is to modify configurations of steel plates or formed products, not the configuration of the die, to remove residual stress. An exemplary modification method is to provide an opening or a slit in the formed product at an area where springback is occurring.

This approach can reduce residual stress which may otherwise cause springback by undertaking a countermeasure against areas where springback is occurring. However, since cutting or punching may decrease rigidity of the product itself, only slight residual stress tends to cause great springback. For this reason, this approach fails to completely eliminate the springback problem. In addition, such an approach needs tests with an actual test die and a steel plate, which increases man-hours and costs at the design stage.

Patent Documents 2-5 also disclose simulations by the finite element method. The methods disclosed in Patent Documents 2-4 employ partial stress release and modification. In Patent Document 2, however, evaluation is only made with respect to an amount of angle variations, i.e., torsion, before and after springback occurs in parts and thus factors that cause deformation other than torsion are outside of the discussion. In Patent Document 2, all the stress components at release positions during stress release are set to 0. If deformation is large, linear approximation performed with respect to stress gradients produces larger inconsistency between the linear approximation and actual nonlinear transition.

RELATED ART DOCUMENTS

Patent Documents

[Patent Document 1] Japanese Unexamined Patent Application, First Application No. 2003-33828
[Patent Document 2] Japanese Unexamined Patent Application, First Application No. 2007-229724
[Patent Document 3] Japanese Unexamined Patent Application, First Application No. 2008-49389
[Patent Document 4] Japanese Unexamined Patent Application, First Application No. 2008-55476
[Patent Document 5] Japanese Unexamined Patent Application, First Application No. 2004-148381

Non Patent Documents

[Non Patent Document 1] Mitsubishi Motors Corporation technical review (Nov. 18, 2006, pages 126 to 131)

DISCLOSURE OF THE INVENTION

Problem that the Invention is to Solve

As described above, although the press-forming process and the press-formed product have been analyzed through numerical analysis, it is difficult to accurately specify the cause of springback in a press-formed product at the design stage before conducting actual forming tests.

It is therefore an object of the invention to provide analysis of the cause of springback with which an area of a press-formed product in which springback occurs can be analyzed more accurately than ever before through numerical analysis and thus the time and cost needed to determine a process for a forming product can be reduced.

Means to Solve the Problems

The invention has the following aspects in order to solve the foregoing problems.

(1) A first aspect of the invention is a method of analyzing a cause of springback, which includes: performing a forming analysis through a numerical simulation based on a forming condition of a plastically formed product so as to calculate forming data of the formed product; decomposing, over an entire of the formed product, stress data included in the forming data of the formed product into an in-plane stress component and a bending moment component with respect to at least one directional component of directional components of the stress; generating, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component; performing a calculation for at least one directional component of stress in the before-calculation individual decomposition forming data regarding each of areas divided from the formed product, so as to generate an after-calculation individual decomposition forming data; analyzing a first springback configuration obtained through a numerical simulation with respect to the before-calculation individual decomposition forming data and a second springback configuration obtained through a numerical simulation with respect to the after-calculation individual decomposition forming data; obtaining a degree of influence of a stress in each of the areas with respect to a springback deformation, calculated based on a before-springback configuration of the formed product included in the forming data, the first springback configuration, and the second springback configuration; and displaying the degree of influence with respect to the springback deformation calculated for each area.

(2) In the method of (1), the performing of the forming analysis may be executed through numerical simulation by a finite element method using multiple elements; an average stress in a plate thickness direction of each directional component for each element in the forming data of the formed product may be used as the in-plane stress component of the directional component; and a value obtained by subtracting the average of the in-plane stress from each of the directional components of the stress value for all of the integration points which arises for each element may be used as the bending moment component of the directional component.

(3) In the method of (1), the calculation may be executed by multiplying at least one of directional components of a stress of the before-calculation individual decomposition forming data by a coefficient k in a range of $-2 \leq k \leq 2$.

(4) In the method of (3), the range of the coefficient k may be $0 < k \leq 1$.

(5) In the method of (4), the range of the coefficient k may be $0.5 \leq k \leq 0.95$.

(6) In the method of (1), the formed product may be a press-formed product.

(7) A second aspect of the invention is a springback cause analysis device, which includes: a forming analysis section that performs a forming analysis through a numerical simulation based on a forming condition of a plastically formed product so as to calculate forming data of the formed product;

a decomposing section that decomposes, over an entire of the formed product, stress data included in the forming data of the formed product into an in-plane stress component and a bending moment component with respect to at least one directional component of directional components of the stress; a before-calculation individual decomposition forming data generating section that generates, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component; a calculation section that performs a calculation for at least one directional component of stress in the before-calculation individual decomposition forming data regarding each of areas divided from the formed product, so as to generate an after-calculation individual decomposition forming data; a springback analyzing section that analyzes a first springback configuration obtained through a numerical simulation with respect to the before-calculation individual decomposition forming data and a second springback configuration obtained through a numerical simulation with respect to the after-calculation individual decomposition forming data; an influence obtaining section that obtains a degree of influence of a stress in each of the areas with respect to a springback deformation, calculated based on a before-springback configuration of the formed product included in the forming data, the first springback configuration, and the second springback configuration; and a display section that displays the degree of influence with respect to the springback deformation calculated for each area.

(8) In the device of (7), the display section may display the degree of influence with respect to the springback deformation calculated for each of the areas as a contour display.

(9) A third aspect of the invention is a program for analyzing a cause of springback, which includes: performing a forming analysis through a numerical simulation based on a forming condition of a plastically formed product so as to calculate forming data of the formed product; decomposing, over an entire of the formed product, stress data included in the forming data of the formed product into an in-plane stress component and a bending moment component with respect to at least one directional component of directional components of the stress; generating, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component; performing a calculation for at least one directional component of stress in the before-calculation individual decomposition forming data regarding each of areas divided from the formed product, so as to generate an after-calculation individual decomposition forming data; analyzing a first springback configuration obtained through a numerical simulation with respect to the before-calculation individual decomposition fanning data and a second springback configuration obtained through a numerical simulation with respect to the after-calculation individual decomposition forming data; obtaining a degree of influence of a stress in each of the areas with respect to a springback deformation, calculated based on a before-springback configuration of the formed product included in the forming data, the first springback configuration, and the second springback configuration; and displaying the degree of influence with respect to the springback deformation calculated for each area.

(10) In the program of (9), the performing of the analysis may be executed through numerical simulation by a finite element method using multiple elements; an average stress in a plate thickness direction of each directional component for each element in the forming data of the formed product may be used as an in-plane stress component of the directional component; and a value obtained by subtracting average of the in-plane stress from each of the directional components of the stress value for all of the integration points for each element is used as a bending moment component of the directional component.

(11) A fourth aspect of the invention is a computer-readable recording medium in which the program for analyzing the cause of springback according to (9) is recorded.

(12) A fifth aspect of the invention is a method of analyzing a cause of springback, which includes: performing a forming analysis through a numerical simulation based on a forming condition of a plastically formed product so as to calculate forming data of the formed product; decomposing, over an entire of the formed product, stress data included in the forming data of the formed product into an in-plane stress component and a bending moment component with respect to at least one directional component of directional components of the stress; generating, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component; performing a calculation for at least one directional component of stress in the before-calculation individual decomposition forming data regarding each of areas divided from the formed product, so as to generate an after-calculation individual decomposition forming data; analyzing a springback configuration obtained through a numerical simulation with respect to the after-calculation individual decomposition forming data; obtaining a degree of influence of a stress in each of the areas with respect to a springback deformation calculated based on a before-springback configuration of the formed product included in the forming data and the springback configuration; and displaying the degree of influence with respect to the springback deformation calculated for each area.

Effects of the Invention

According to the present invention, the cause of springback can be accurately analyzed and the time needed to determine a forming process for a formed product can be reduced.

Further, the present invention provides a springback cause analysis which cannot be performed with actual products. Countermeasures against the springback can be taken by decomposing the problem into small components.

The present invention includes dividing a press-formed product into areas and multiplying, by a coefficient k, at least one directional component of stress in individual decomposition forming data in an area of interest for each of the areas. The coefficient k is preferably in a range of −2≤k≤+2 (including 0). If the coefficient k is 0, calculation is simplified and influence of stress for each area with respect to springback deformation can be evaluated clearly, based on the calculated degree of influence. If the coefficient k is a value close to +1, the degree of influence can be calculated and evaluated with higher accuracy. Evaluation accuracy is improved with the value of the coefficient k close to 1 as compared to the coefficient k close to 0 because a relationship between stress and displacement is practically nonlinear. If deformation is small, there is almost no difference in stress gradients before and after editing with respect to displacement between linear approximation simulation and an actual nonlinear process. In this case, even if calculation is performed with the coefficient k set to 0, the value of the degree of influence of the stress with respect to the springback for each area can be sufficiently accurate for analysis and evaluation. If deformation is large, on the contrary, difference in the stress gradients before and after editing with respect to the displacement becomes large between the linear approximation simulation and an actual nonlinear process. Therefore, the linear approximation may include errors. If the calculation is performed so that a value of stress after editing is close to a value of stress before editing (i.e., if the coefficient k is close to 1), the calculation is performed with the stress gradients before and after the editing with respect to the deformation are close to that of an actual nonlinear process. Accuracy in evaluating values of the degree of influence of the stress with respect to the springback of each area is therefore improved as compared to a case where the coefficient k is 0 (see FIG. 10). It is especially advantageous to set the coefficient k to be a value close to +1.

EMBODIMENTS OF THE INVENTION

Hereinafter, preferred embodiments of the present invention will be described referring to analysis of a cause of springback in a product press-formed from a thin plate material. Application of the present invention, however, is not limited to the same, and may include roll-formed products and formed linear materials.

Figure 1:
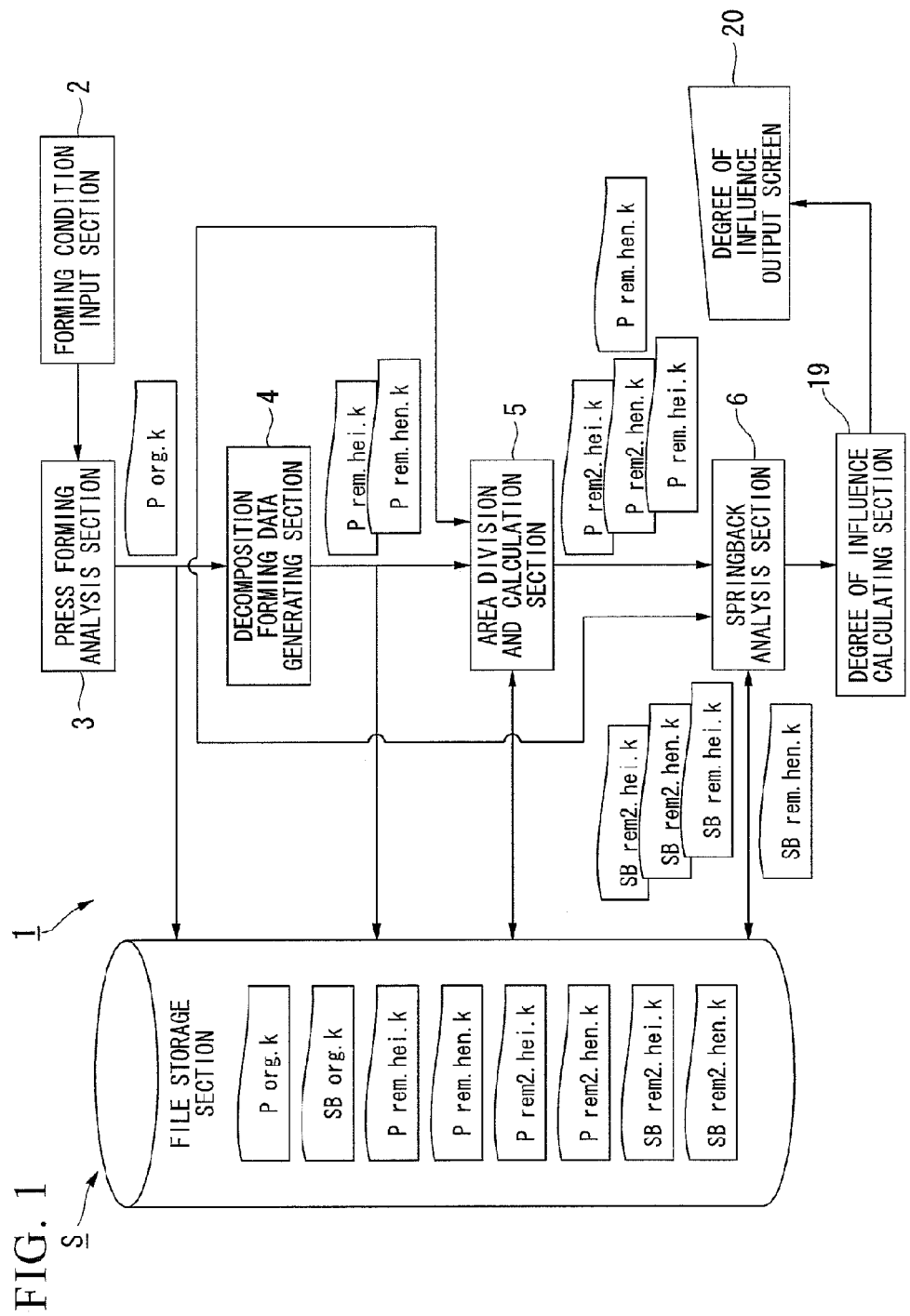
FIG. 1 illustrates a configuration of a device which analyzes a cause of springback according to an embodiment of the present invention.

FIG. 1 illustrates a functional configuration of a springback cause analysis device 1 according to an embodiment of the present invention. The springback cause analysis device 1 includes a forming condition input section 2, a press-forming analysis section 3, a decomposition forming data generating section 4, an area division and calculation section 5, a springback analysis section 6, a degree of influence calculating section 19, a degree of influence output screen 20 which is a display section, and a file storage section S.

The forming condition input section 2 is for inputting forming conditions, which includes configuration data (including plate thickness, length, width, curvature and distortion), nature (including quality of material, such as strength and extension), a die configuration (including configurations of a die and a punch, curvature, diameter, clearance and lubrication condition), press conditions (including load for pressing wrinkles, pad load, bead tension, pressing pressure and temperature) regarding a steel plate to be analyzed in the press-forming analysis section 3 and the springback analysis section 6. Data areas used for forming analysis, data areas used in the decomposition forming data generating section 4, data areas used in the area division and calculation section 5 and divided areas used for displaying an analysis result on an output screen can be set up separately and can be input.

The press-forming analysis section 3 obtains, through numerical analysis, a configuration, stress, distortion, plate thickness of a formed product to be press-formed on the basis of the data input from the forming condition input section 2. The numerical analysis may be performed by an elastic-plastic finite element method, a rigid-plastic finite element method, a one-step finite element method and a boundary element method. The press-forming analysis section 3 outputs results of the numerical analysis in a form of variables, such as plate thickness of a workpiece, component values of stress and component values of strain or a distribution of these variables. Output data (i.e., original data) is output to the decomposition forming data generating section 4, the area division and calculation section 5, the springback analysis section 6 and the degree of influence calculating section 19 as, for example, a file "P org.k." and is stored in the file storage section S.

The numerical analysis in the press-forming analysis section 3 may include setting up the forming conditions, such as configuration data, nature, die configuration and press conditions, using the finite element method and performing forming analysis to numerically obtain distribution of stress and strain after forming. Examples of software used for the numerical analysis in the finite element method include commercially-available software, such as PAM-STANP, LS-DYNA, AUTOFORM, OPTRIS, ITAS-3D, ASU/P-FORM, ABAQUS, MARC, HYSTAMP, HYPERFORM, SIMEX, FASTFORM-3D and QUICKSTAMP.

The decomposition forming data generating section 4 decomposes, over the entire press-formed product, the forming data regarding the press-formed product acquired in the press-forming analysis section 3 into an in-plane stress component and a bending moment component with respect to at least one of directions of directional components of the stress for each element. Regarding the stress of the directional components obtained by the decomposition of the forming data of the press-formed product acquired in the press-forming analysis section 3, individual decomposition data having only an in-plane stress component and individual decomposition data having only a bending moment component are generated. The in-plane stress component herein is a mean stress component of the distribution in a plate thickness direction of the in-plane direction stress of the formed product. The bending moment component is a deviator stress of the distribution in the plate thickness direction in the in-plane direction stress of the formed product, that is, a stress component having a distribution in the plate thickness direction obtained by subtracting the mean stress component from the distribution in the plate thickness direction. in the in-plane direction stress.

The mean stress of the distribution in the plate thickness direction for every element of the result of the forming analysis is assigned to all the integration points in the plate thickness direction for every element to generate in-plane stress component decomposition data. Bending moment component decomposition data is also generated by subtracting the mean stress extracted from the original forming analysis result from the stress values of all the integration points in plate thickness direction generated for every element. That is, the mean stress in the forming data is used as the in-plane stress component and a value obtained by subtracting the in-plane mean stress from the stress values of all the integration points in plate thickness direction generated for every element is used as the bending moment component.

Decomposition to the directions of the stress herein may be performed on the basis of a global coordinate system or a local coordinate system. The local coordinates system is based on a coordinate system of nodes constituting each of the elements. The local coordinate system may be set to each element on the basis of the global coordinate system in an initial state in the press-forming analysis of each element, i.e., in a state of an initial blank of the pressing, and the stress may be decomposed on the basis of a coordinate system after the press-forming obtained by moving and rotating the local coordinate system set for each element following deformation of each element in the press-forming.

In this manner, "P rem.hei.k" and "P rem.hen.k" are acquired. "P rem.hei.k" is individual decomposition data obtained by decomposing data of the forming analysis result obtained by numerically analyzing the forming conditions of the press-formed product into data of the in-plane stress component with respect to at least one of directions of the directional components of the stress over the entire press-formed product. "P rem.hen.k" is individual decomposition data obtained by decomposing data of the forming analysis result obtained by numerically analyzing the forming conditions of the press-formed product into data of the bending moment component with respect to at least one of directions of the directional components of the stress over the entire press-formed product. These individual decomposition data are output to the area division and calculation section 5 and the springback analysis section 6, and are stored in file storage section S.

The area division and calculation section 5 inputs data files "P rem.hei.k" and "P rem.hen.k" output from the decomposition forming data generating section 4, performs area division on the basis of configuration data of the press-formed product, performs calculation for each area, outputs "P rem2.hei.k" and "P rem2.hen.k" for each area as a calculation result to the springback analysis section 6 and stores the data in the file storage section S. The calculation is performed with respect to at least one of directional components of the stress in an area of interest for each of the divided areas regarding "P rem.hei.k" and "P rem.hen.k." The calculation is a multiplication using a coefficient k, which is preferably $-2 \leq k \leq +2$, more preferably $0 < k \leq 1$ and even more preferably $0.5 \leq k \leq 0.95$.

The above-described calculation is to multiply the stress components of only a specified area among the divided areas by the coefficient $k_i$ (i=1 to 6).

$$\sigma x = k_1 \times \sigma x0$$

$$\sigma y = k_2 \times \sigma y0$$

$$\sigma z = k_3 \times \sigma z0$$

$$\tau xy = k_4 \times \tau xy0$$

$$\tau yz = k_5 \times \tau yz0$$

$$\tau zx = k_6 \times \tau zx0$$

Here, the stress components before the integration point of a selected area are represented by ($\sigma x0$, $\sigma y0$, $\sigma z0$, $\tau yz0$, $\tau zx0$). The stress component after the calculation is represented by ($\sigma x$, $\sigma y$, $\sigma z$, $\tau xy$, $\tau yz$, $\tau zx$). The coefficient $k_i$ is $-2 \leq k_i \leq +2$. All of the $k_i$ may be 0, or at least one of the $k_i$ may be 0 and others may be any values within the range described above.

The area division and calculation section 5 acquires data of the press-formed product from the input data and divides the data of the press-formed product into multiple areas. The areas may be divided in uniform size on the basis of the configuration of the press-formed product. Alternatively, the areas may be uniformly divided on the basis of the configuration of a blank material before being press-formed. The divided areas of the formed product may be determined on the basis of the curvature or the magnitude of the stress obtained as a result of the press-forming analysis or may be specified by an analysis operator.

The springback analysis section 6 performs a springback analysis using data files "P rem.hei.k" and "P rem.hen.k" output from the decomposition forming data generating section 4, and data files "P rem2.hei.k" and "P rem2.hen.k" output from the area division and calculation section 5 as input data. The springback analysis section 6 then computes the configuration of the formed product after springback occurs, and outputs "SB rem.hei.k", "SB rem.hen.k", "SB rem2.hei.k" and "SB rem2.hen.k" as calculating result data to the degree of influence calculating section 19 and stores the data in the file storage section S. The springback analysis is a numerical analysis of the configuration of a formed product after springback occurs by performing calculation for an unloading process by, for example, an elastic finite element method, an elastic-plastic finite element method or a one-step finite element method on the basis of variables and distribution of the variables of such as a plate thickness, a stress component value and a distortion component value acquired by the decomposition forming data generating section 4 and the area division and calculation section 5. The springback configuration is acquired as finite element analysis data (i.e., data regarding each element and data regarding nodes constituting each element).

The degree of influence calculating section 19 calculates a degree of influence with respect to the springback for each divided area on the basis of the press-forming data which is an analysis result of the press-forming analysis section 3 and "SB rem.hei.k", "SB rem.hen.k", "SBrem2.hei.k" and "SB rem2.hen.k" which are analysis results of the springback analysis section 6.

The degree of influence with respect to the springback is calculated by comparison of a springback amount obtained by using, as input data, individual decomposition data "P rem.hei.k" and "P rem.hen.k" generated in the decomposition forming data generating section 4, and the springback amount obtained by using, as input data, the data file "P rem2.hei.k" and "P rem2.hen.k" output from the area division and calculation section 5.

The following may be used for a springback amount, as a target of evaluation of the degree of influence, that is, a positional difference (i.e., displacement) of a specific point (i.e., a specific node of finite element data) in a coordinate system before and after occurrence of springback, an angular difference (i.e., torsion) of a line connecting two specific points before and after occurrence of springback, a difference in relative displacement of two specific points (i.e., relative displacement) before and after occurrence of springback, or an angular difference (i.e., relative torsion) of an angle defined by a line connecting two specific points and a line connecting other two specific points before and after occurrence of springback.

The springback amount of the individual decomposition data "P rem.hei.k" and "P rem.hen.k" may be obtained based on a difference between configurations before and after occurrence of springback. A configuration of the press-forming data which is an analysis result of the press-forming analysis section 3 may be used as the configuration before the occurrence of springback, and "SB rem.hei.k" and "SB rem.hei.k" which are analysis results of the springback analysis section 6 may be used as the configuration after the occurrence of springback.

The springback amount of "P rem2.hei.k" and "P rem2.hen.k" calculated for each divided area may be obtained based on a difference between configurations before and after occurrence of springback. Press-forming data which are analysis results of the press-forming analysis section 3 may be used as the configuration before the occurrence of springback, and "SB rem2.hei.k" and "SB rem2.hen.k" which are analysis results of the springback analysis section 6 may be used as the configuration after the occurrence of springback.

The degree of influence with respect to the springback is obtained by multiplying a difference between a springback amount of the individual decomposition data "P rem.hei.k"

and "P rem.hen.k" and a springback amount of "P rem2.hei.k" and "P rem2.hen.k" calculated for each divided area by a reciprocal of a "coefficient k (which was used for the calculation)−1." If areas of the divided areas are unequal, the multiplication result may further be divided by the area of the area to acquire as the degree of influence per unit area.

The above-described springback amount is computed on the basis of springback analysis using a fixed point set up in an original data file "P org.k." However, the springback amount varies largely depending on the position of the fixed point. If the degree of influence with respect to the springback is to be acquired on the basis of another fixed point, it is preferred that press-forming data which are analysis results of the press-forming analysis section 3 and "SB rem.hei.k", "SB rem.hei.k", "SB rem2.hei.k" and "SB rem2.hei.k" which are analysis results of the springback analysis section 6 are aligned with one another (i.e., moved or rotated) at a fixed point for which evaluation is to be performed and then calculating the degree of influence with respect to the springback. In this manner, the degree of influence with respect to the springback at another fixed point can be easily obtained without performing again the forming analysis or the springback analysis.

The degree of influence calculating section 19 can acquire distribution of the degree of influence with respect to the springback over the entire press-formed product by sequentially calculating the degree of influence with respect to the springback described above for each divided area.

It is preferred that the degree of influence of each divided area with respect to the springback is displayed as a contour display on a degree of influence display section output screen 20. According to the present invention, as described in Examples later, the springback is analyzed on the basis of individual decomposition data decomposed into the in-plane stress component and the bending moment component, and individual decomposition data obtained by multiplying, by a coefficient k, at least one directional component of the stress in an area of interest for each of the areas divided from a press-formed product. Then, a degree of influence of the directional components of the stress in each area with respect to the springback is calculated. In the present invention, the thus-calculated degree of influence may be displayed separately or may be displayed as a contour display over an entire component. Those displays may be made for each stress component. In this manner, the cause of springback can be analyzed more easily and accurately than ever before.

Figure 2:
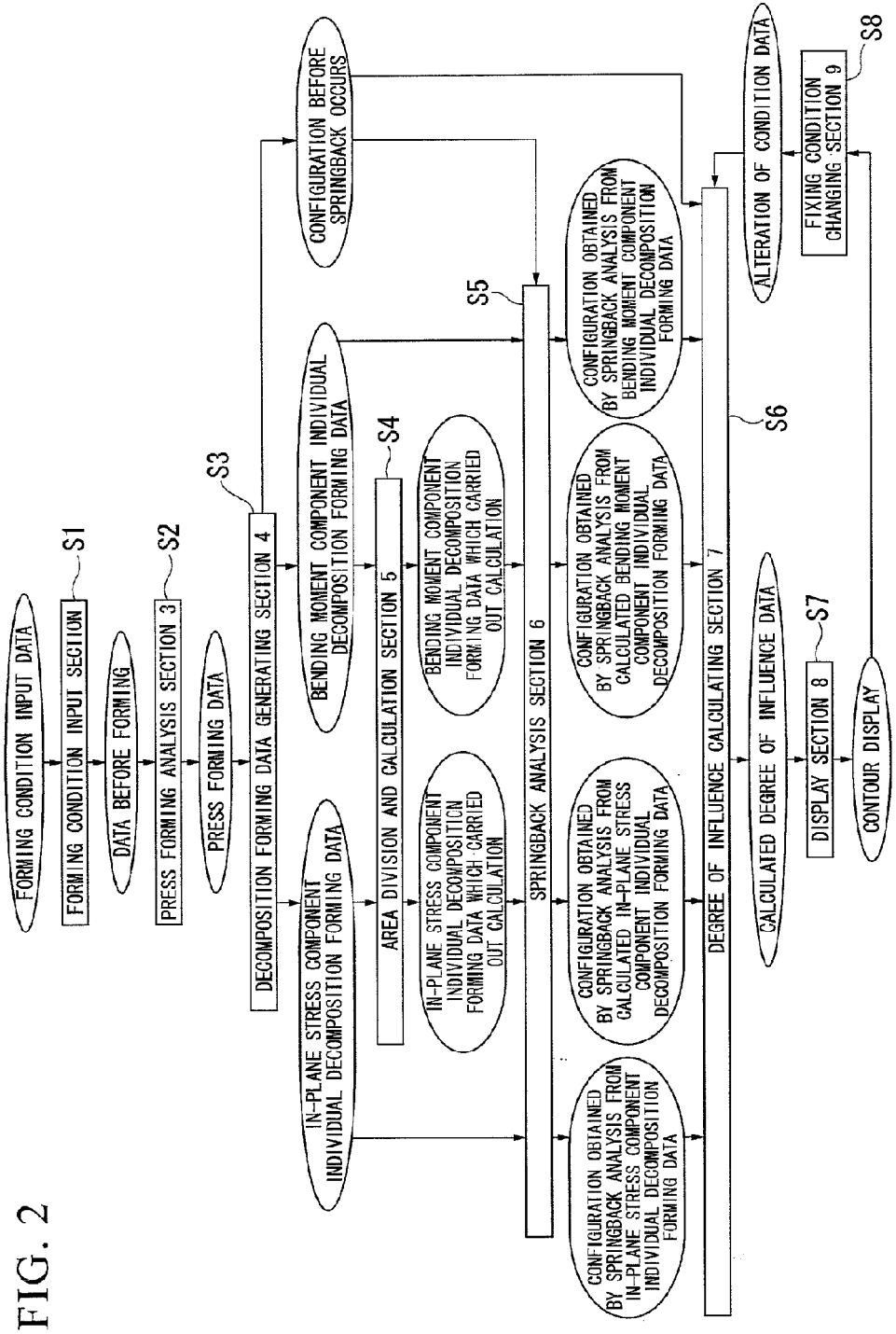
FIG. 2 schematically illustrates a method of analyzing the cause of springback according to an embodiment of the present invention.

FIG. 2 illustrates a flow of a method of analyzing the cause of springback according to an embodiment of the present invention described above. As illustrated in FIG. 2, forming conditions are input in the forming condition input section 2 in step 1. In step 2, the press-forming analysis section 3 performs a press-forming analysis process through numerical analysis on the basis of the forming conditions of the press-formed product to calculate forming data of the press-formed product. In step 3, the decomposition forming data generating section 4 decomposes the stress into an in-plane stress component and a bending moment component to generate individual decomposition data. In step 4, the area division and calculation section 5 divides data of the press-formed product into multiple areas, and performs calculation with respect to at least one direction of stress data for each area to generate calculation data. In step 5, a springback analysis section 6 performs springback analysis to calculate a configuration after the springback occurs. In step 6, a degree of influence calculating section 7 calculates a degree of influence of each divided area with respect to the springback on the basis of the configuration of the press-formed product after the springback occurs. In step 7, a display section 8 displays the calculation result as a contour display on a screen of the display section or outputs the calculation result to a printer. In step 9, on the basis of the thus-obtained output result, if necessary, a fixing condition changing section 9 changes a fixed point of the springback to calculate a degree of influence with respect to the springback for detailed evaluation. The formed product can be formed on the basis of the foregoing method of analyzing the cause of springback. For example, a divided area with a high degree of influence with respect to the springback can be specified on the basis of the foregoing result obtained by the method of analyzing the cause of springback. Regarding the thus-specified area of the cause of springback, if either the in-plane mean stress or the deviator stress, which are the causes of occurrence of the springback, is high, a countermeasure can be taken separately against the specified cause of springback. The design of the die can be changed in accordance with the specified cause of springback in order to provide a formed product with a reduced amount of springback.

Figure 3:
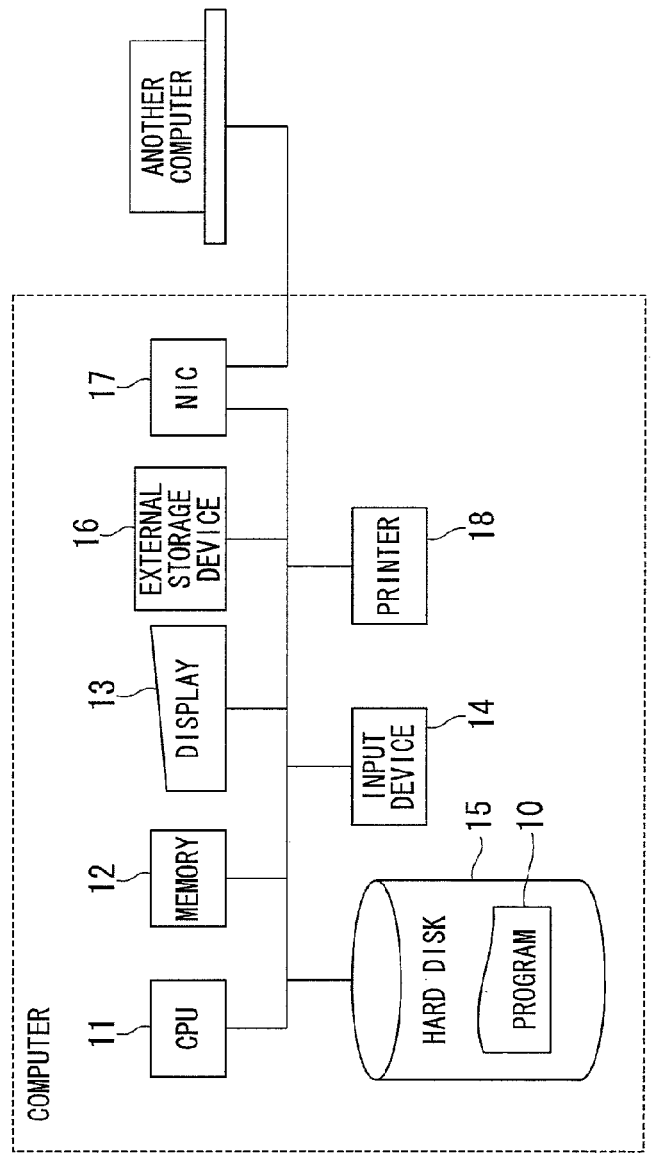
FIG. 3 illustrates an exemplary hardware configuration of a device which analyzes a cause of springback.

FIG. 3 illustrates an exemplary hardware configuration of a device used to analyze the cause of springback. Processes in the press-forming analysis section 3, the decomposition forming data generating section 4, the area division and calculation section 5 and the springback analysis section 6 are provided by a program 10 for analyzing the cause of springback, and are executed by a computer. The computer includes a CPU 11, a memory 12 which stores the processing result, a display 13 which is a display section, input devices 14, such as a keyboard and a mouse, a hard disk 15, an external storage device 16, such as a CD/DVD drive, a network interface card (NIC) 17 and a printer 18. The program 10 for analyzing the cause of springback may record data on a computer-readable recording medium for distribution. Hereinafter, the present invention will be described more in detail with reference to Examples.

EXAMPLES

Example 1

An Example in which all Stress Components were Set to 0

Figure 4:
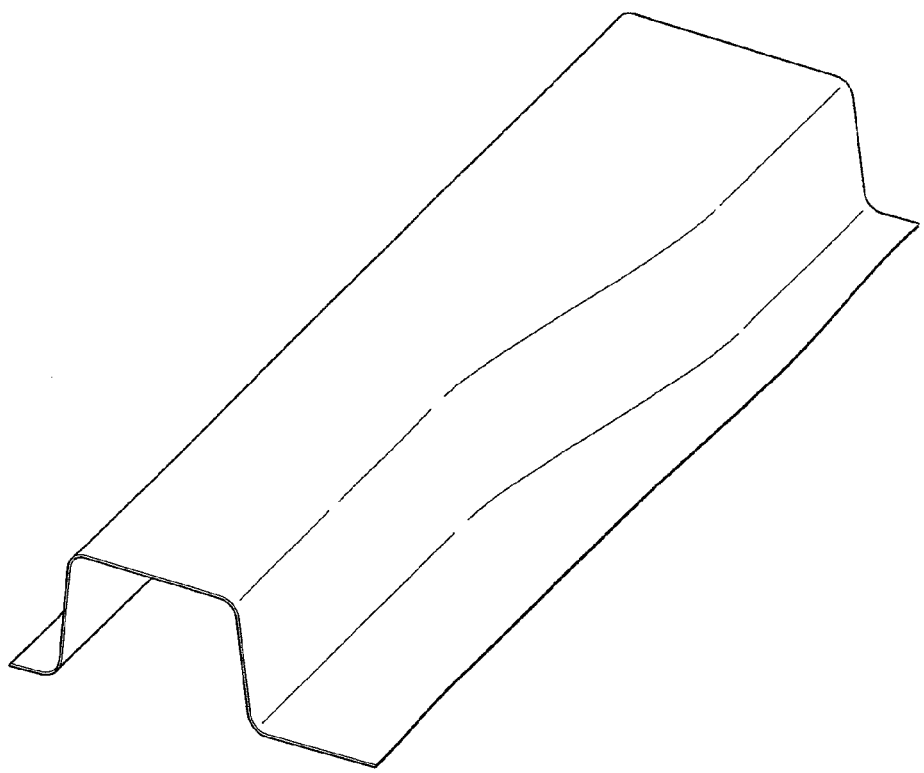
FIG. 4 is a perspective view illustrating a configuration of a press-formed product in Example 1.

FIG. 4 is a perspective view illustrating a configuration of a press-formed product in Example 1 according to the present invention. First, a press-forming analysis was performed by commercially-available software LS-DYNA for simulation analysis of plate forming on the basis of the finite element method. As the data regarding the nature of a metal plate, data regarding a high-strength steel plate having a plate thickness of 1.6 mm and tensile strength of 590 MPa was used. The configuration of the die (i.e., a die, a punch or a holder) was modeled into shell elements, and then analyzed as rigid bodies. Die clearance was set to 0 mm. The friction coefficient was set to 0.15. Forming load was set to 3000 kN.

A program which generates individual decomposition data decomposed into the in-plane stress component (i.e., the mean stress) and the bending moment component (i.e., the deviator stress) takes in a file to which data regarding the stress and distortion acquired from the press-forming analysis are output, as an input data, and generated individual decomposition data from the input data taken in. Here, the mean stress for each element extracted from the original forming analysis result is assigned to all the integration points in the plate thickness direction for each element, and in-plane stress component decomposition data is generated. The mean stress extracted from the original forming analysis result is subtracted from the stress values (which were respectively generated in each element) of all the integration points in the plate thickness direction so as to generate bending moment component decomposition data.

Figure 5:
FIG. 5 illustrates divided areas of the press-formed product in Example 1.
Figure 5:
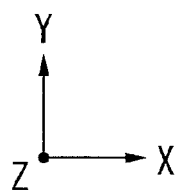

A program which executed area division and calculation takes in a file to which data regarding stress and distortion acquired from individual decomposition data were output as input data, and divides the areas of the press-formed product for the calculation. FIG. 5 illustrates divided areas of the press-formed product illustrated in FIG. 4 in Example 1 of the present invention. Calculation herein was performed for all the integration points of elements belonging to each area. In the calculation, all stress components were multiplied by the coefficient 0 to obtain $\sigma=0$, $\sigma y=0$, $\sigma z=0$, $\tau xy=0$, $\tau yz=0$ and $\tau zx=0$.

The stress components before the calculation at the integration points of a selected area are represented as ($\sigma x0$, $\sigma y0$, $\sigma z0$, $\tau xy0$, $\tau yz0$, $\tau zx0$). The stress components after the calculation at the integration points of the selected area are represented as ($\sigma x$, $\sigma y$, $\sigma z$, $\tau xy$, $\tau yz$, $\tau zx$). The calculated stress was output as a calculation result file.

Next, a springback analysis process was performed using the above-mentioned software LS-DYNA. Output results from the program executing the area division and calculation were input to the software LS-DYNA to analyze the springback. The springback was analyzed using elastic analysis by a static implicit method. The calculation and springback analysis were repeated for all the divided areas.

Figure 6:
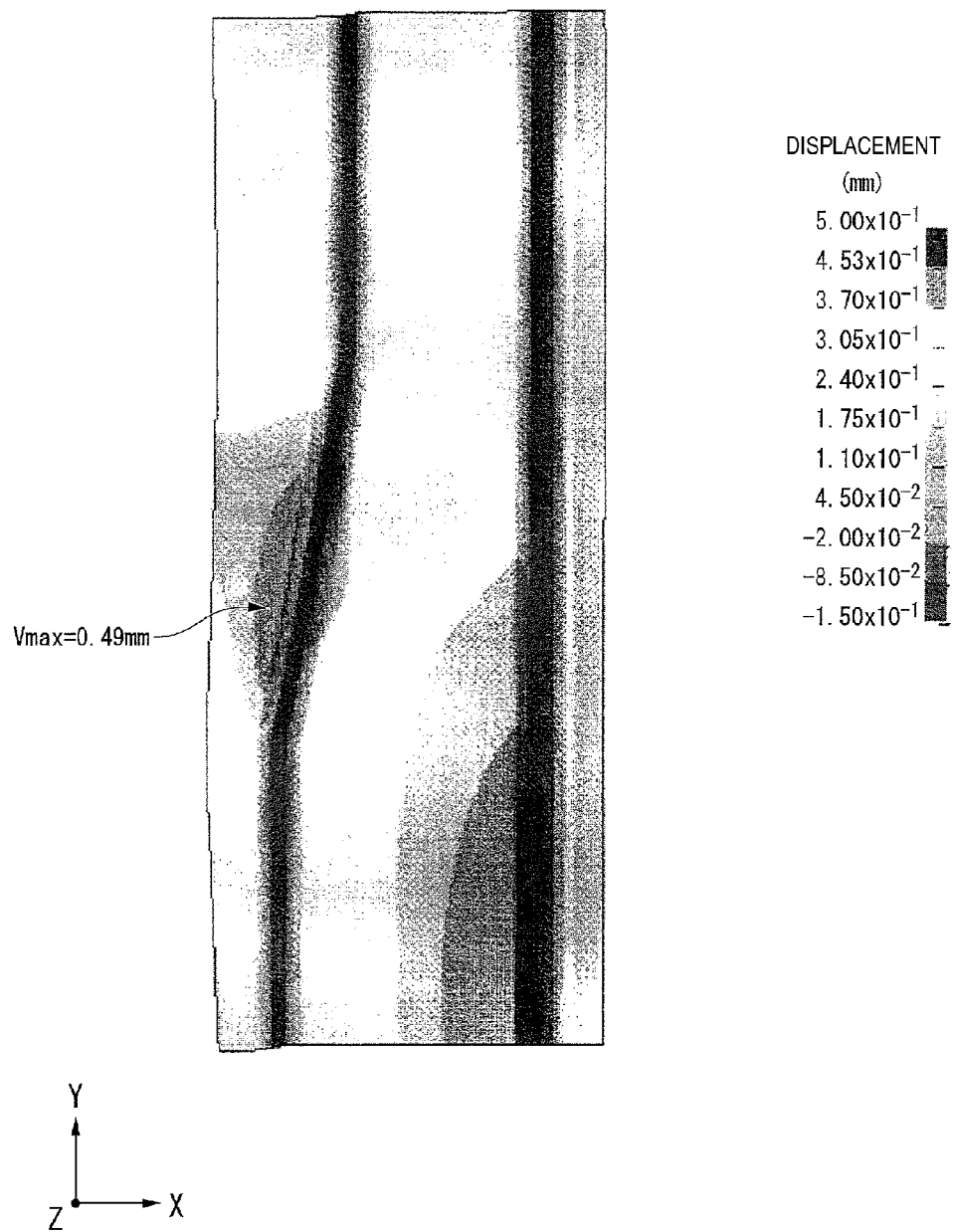
FIG. 6 illustrates a result of springback analysis based on original data acquired from press-forming analysis.

FIG. 6 illustrates a result of the springback analysis based on the original data acquired from the press-forming analysis of Example 1 of the present invention. FIG. 6 illustrates an evaluation of the displacement in the Y direction. In the drawing, Vmax=0.49 mm represents that the springback amount at a position at which the displacement in the Y direction becomes a maximum was 0.49 mm.

Figure 7A:
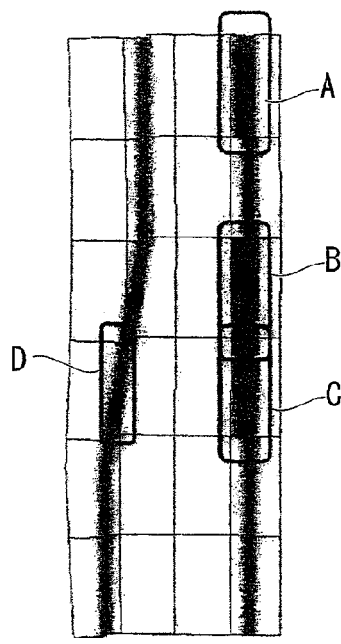
FIG. 7A illustrates a springback amount in each area for which calculation is performed with respect to bending moment component (i.e., deviator stress) decomposition data.
Figure 7B:
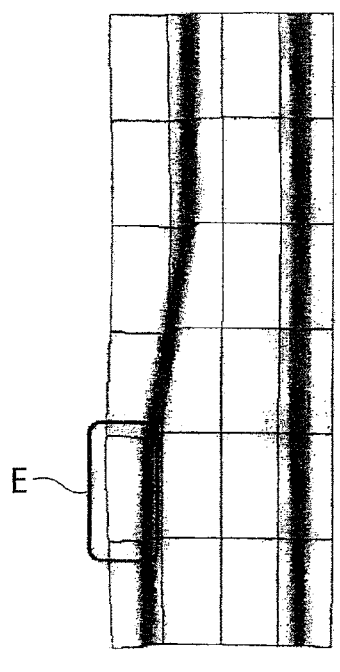
FIG. 7B illustrates a springback amount in each area for which calculation is performed with respect to in-plane stress component (i.e., mean stress) decomposition data.

FIG. 7A and FIG. 7B are examples of analysis on the entire surface of the part to which the bending moment component (i.e., the deviator stress) and the in-plane stress component (i.e., the mean stress) with respect to the springback amount with Vmax=0.49 mm in FIG. 6 are influenced.

FIG. 7A illustrates the springback amount in each area for which calculation is performed with respect to the bending moment component (i.e., deviator stress) decomposition data of Example 1 of the present invention.

FIG. 7B illustrates the springback amount in each area for which calculation is performed with respect to in-plane stress component (i.e., mean stress) decomposition data of Example 1 of the present invention.

As illustrated in FIGS. 7A and 7B, a causal area of the springback with respect to the Y direction displacement (Vmax) at the maximum displacement position in the Y direction illustrated in FIG. 6 was separated into the influence of the in-plane stress component and the influence of the bending moment component so that degrees of influence thereof was specified. In FIG. 7A which illustrates the influence of the deviator stress, the influence quantities of areas represented by A, B, C and D were +0.28 mm, −0.43 mm, +0.21 mm and +0.34 mm, respectively. In FIG. 7B which illustrates the influence of the mean stress, the influence quantity of an area represented by E was +0.10 mm. As seen from FIGS. 7A and 7B, both the in-plane stress component and the bending moment component have influence on the springback amount in the Y direction.

As described in Example 1, according to an embodiment of the present invention, the springback causal area can be analyzed quantitatively. Further, it can be easily and accurately analyzed whether the springback is caused by the in-plane stress component or by the bending moment stress component through numerical analysis. The analysis result was displayed visually so that the springback causal area could be specified easily. The analysis can be performed on a computer without requiring an actual die or a steel plate. Accordingly, the forming process can be selected easily at the design stage.

Example 2

An Example in which Only $\sigma y$ of the In-Plane Stress Component was Set to 0

Figure 8A:
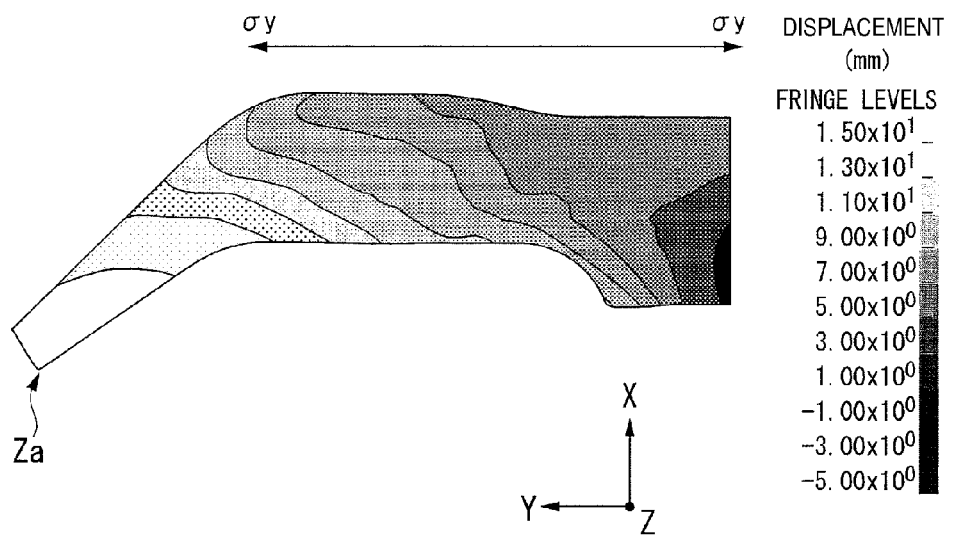
FIG. 8A illustrates a configuration of a press-formed product in Example 2.
Figure 8B:
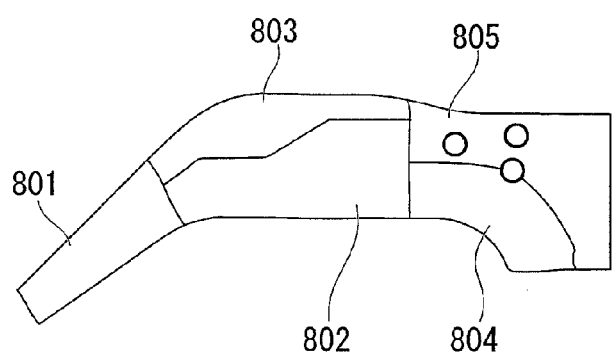
FIG. 8B illustrates divided areas and fixed points of the press-formed product in Example 2.

In the above described Example 1, all stress components of all integration points of elements belonging to each area were multiplied by the coefficient 0. Various other calculations will be described below. FIG. 8A illustrates a configuration of a press-formed product of Example 2. FIG. 8B illustrates divided areas of the press-formed product illustrated in FIG. 8A. In FIG. 8B, three small circles represent fixed points. The individual decomposition data having only the in-plane stress component was generated from the original data and the in-plane stress was analyzed. A displacement amount in the Z-axis direction (i.e., a direction perpendicular to the sheet of paper) represented by Za was evaluated as the springback amount.

The entire press-formed product was divided into five areas: area 801 to area 805. In Example 2, only $\sigma y$ that is considered to have the largest influence among the in-plane stress components in each area as shown in Table 1 was multiplied by 0. No calculation was performed to other stress components (i.e., the coefficient k=1). The result of the springback analysis based on the thus-obtained calculation stress is shown in a lower part of Table 1. Table 1 shows that the influence ratio with the $\sigma y$ of the area 804 set to 0 became the maximum. That is, in Example 2, it is shown that the in-plane stress components in the direction of the Y-axis in the areas 803 and 804 are principle causes of the occurrence of the springback amount in the displacement along the Z direction at the section Za caused by the in-plane stress. The springback amount at an end portion (Za) calculated on the basis of the individual decomposition data having only the in-plane stress component was 23.292 mm. Since the sum of the influence quantities of the areas shown in Table 1 is 26.44 mm, it can be confirmed that the present invention provides a substantially accurate analysis.

TABLE 1

CONDITIONS AND RESULTS OF ANALYSIS IN EXAMPLE 2

| ANALYSIS CONDITIONS | | AVERAGE STRESS COMPONENT | | FIXED-POINT (BASE) | | | | |
|---|---|---|---|---|---|---|---|---|
| | | | | AVERAGE STRESS COMPONENT TO BE EDITED | | | | |
| | | | $\sigma x$ | $\sigma y$ | $\sigma z$ | $\tau xy$ | $\tau yz$ | $\tau zx$ |
| STRESS IN | AREA OF INTEREST | | 1.0 | 0.0 | 1.0 | 1.0 | 1.0 | 1.0 |

TABLE 1-continued

CONDITIONS AND RESULTS OF ANALYSIS IN EXAMPLE 2

| | | | | | | | | | | |
|---|---|---|---|---|---|---|---|---|---|---|
| | | | EACH AREA | OTHER THAN AREA OF INTEREST | 1.0 | 1.0 | 1.0 | 1.0 | 1.0 | 1.0 |

SPRINGBACK ANALYSIS RESULTS

| EVALUATED POINT | POINT Za | SUM OF INFLUENCE QUANTITIES | | AREA 801 | AREA 802 | AREA 803 | AREA 804 | AREA 805 | TOTAL |
|---|---|---|---|---|---|---|---|---|---|
| SPECIFIED NODE(MAXIMUM DISPLACEMENT) (mm) | 26.76 | 26.44 | INFLUENCE QUANTITY(mm) | 0.06 | 2.01 | 11.34 | 14.14 | −1.10 | 26.44 |
| | | | INFLUENCE RATIO(%) | 0.21 | 7.51 | 42.37 | 52.84 | −1.11 | 98.82 |

Example 3

An Example in which Fixed Points were Shifted

Figure 9A:
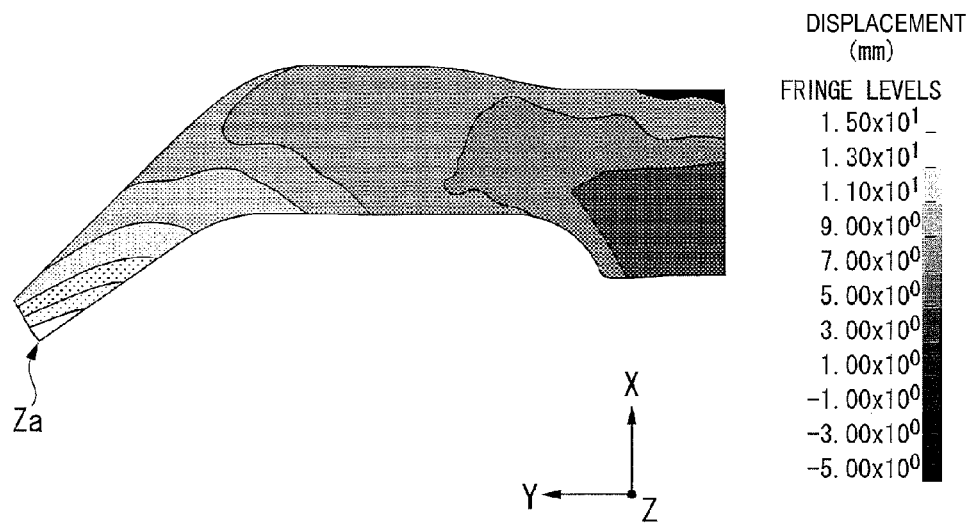
FIG. 9A illustrates a configuration of a press-formed product in Example 3.
Figure 9B:
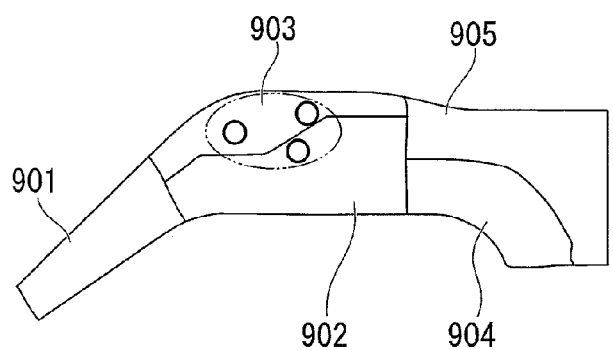
FIG. 9B illustrates divided areas and fixed points of the press-formed product in Example 3.

In Example 3, a press-formed product illustrated in FIG. 9A which had the same configuration as that of Example 2 was used. In Example 3, positions of the fixed point illustrated in FIG. 8B of Example 2 were shifted as illustrated in FIG. 9B. First, as in Example 1, all stress components of elements belonging to each area were multiplied by the coefficient 0. The thus-obtained analysis result is shown in Table 2. The shifting of the fixed points may allow a viewer to determine whether the product seems to be warped because of its designated shape or because it is actually warped. The positions of the fixed points are shifted at the final stage of the calculation, thus, it is not necessary to redo the calculation from the beginning.

decomposition data which had only an in-plane stress component generated from original data. First, a springback amount was evaluated with the all in-plane stress components of the areas to be analyzed being set to 0. As a result of the evaluation, the springback amount with the all in-plane stress component of, for example, the area 801 being set to 0 was 26.59 mm while the springback amount of the individual decomposition data shown in Table 3 being 26.76 mm. Accordingly, the difference which was the degree of influence was 0.17 mm. The sum of the influence quantities with respect to the springback of each of the areas 801 to 805 was 32.63 mm and the error was 21.93%.

Then, regarding the press-formed product of a configuration illustrated in FIG. 8A, all in-plane stress components were multiplied by a coefficient 0.5 as shown in Table 4 and the springback amount was evaluated. As a result of the evaluation, the springback amount with all in-plane stress

TABLE 2

CONDITIONS AND RESULTS OF ANALYSIS IN EXAMPLE 3

| ANALYSIS CONDITIONS | | | AVERAGE STRESS COMPONENT | | | | FIXED POINT CHANGE | | |
|---|---|---|---|---|---|---|---|---|---|
| | | | AVERAGE STRESS COMPONENT TO BE EDITED | | | | | | |
| | | | σx | σy | σz | τxy | τyz | τzx | |
| | STRESS IN EACH AREA | AREA OF INTEREST | 0.0 | 0.0 | 0.0 | 0.0 | 0.0 | 0.0 | |
| | | OTHER THAN AREA OF INTEREST | 1.0 | 1.0 | 1.0 | 1.0 | 1.0 | 1.0 | |

SPRINGBACK ANALYSIS RESULTS

| EVALUATED POINT | POINT Za | SUM OF INFLUENCE QUANTITIES | | AREA 901 | AREA 902 | AREA 903 | AREA 904 | AREA 905 | TOTAL |
|---|---|---|---|---|---|---|---|---|---|
| SPECIFIED NODE(MAXIMUM DISPLACEMENT) (mm) | 13.67 | 17.18 | INFLUENCE QUANTITY(mm) | 2.46 | 5.03 | 6.18 | 5.87 | −2.38 | 17.16 |
| | | | INFLUENCE RATIO(%) | 18.01 | 36.80 | 45.18 | 42.91 | −17.38 | 125.52 |

Example 4

An Example in which all of the In-Plane Stress Components were Multiplied by the Coefficient 0.5

In Example 4, the press-formed product of a configuration illustrated in FIG. 8A was analyzed on the basis of individual components of, for example, the area 801 multiplied by 0.5 was 27.07 mm while the springback amount of the individual decomposition data being 26.76 mm. Here, the degree of influence was −0.63 which was obtained by multiplying the difference, −0.32 mm, by the reciprocal of $(1-k)$, i.e., $1/(1-0.5)=2.0$. The sum of the amount of the degree of influence of the areas 801 to 805 calculated similarly was 27.50 mm and the error was reduced from 21.93% to 2.78%. It is shown that the in-plane stress components in the areas 803 and 804 are principle causes of occurrence of the springback amount at the end portion.

Figure 10:
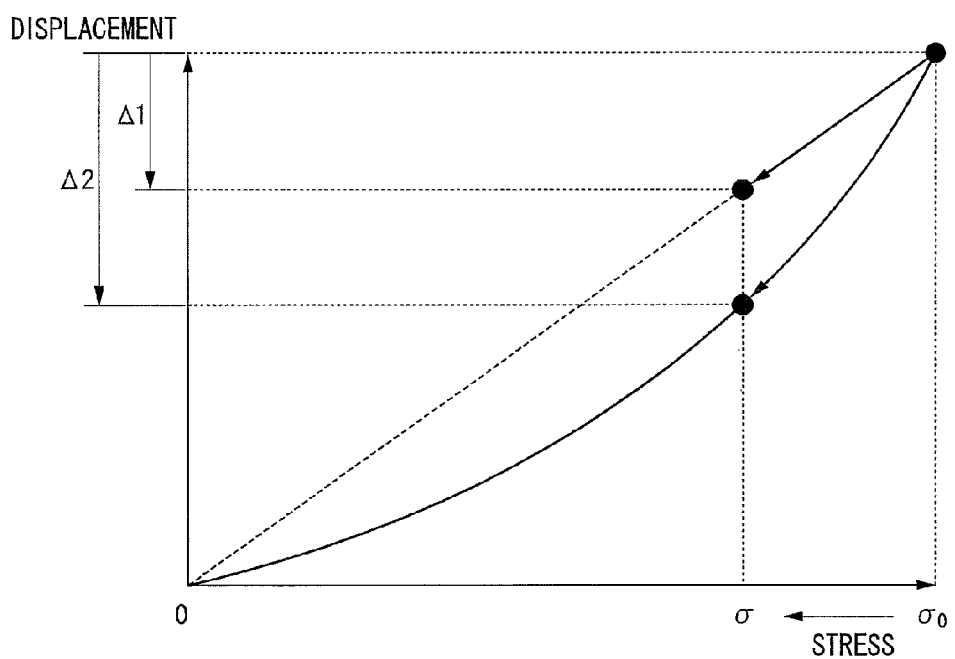
FIG. 10 is a graph which illustrates a relationship between stress and displacement.

The evaluation accuracy was increased with a coefficient of 0.5 as compared to the case with a coefficient of 0. This is because the relationship between the stress and the displacement is not actually linear. If the relationship between the stress and the displacement was linear, the calculation could have been performed with coefficient 0, as a coefficient to be multiplied to a stress component of a certain area. However, the actual relationship between the stress and the displacement is not linear as illustrated in FIG. 10. Accordingly, a gradient of the stress σ0 differs from a gradient of the edited stress σ, and the error becomes large when linear approximation is performed. When the coefficient was set to 0.5, however, the value of the edited stress a could approximate the actual stress value.

TABLE 3

CONDITIONS (k = 0) AND RESULTS OF ANALYSIS IN EXAMPLE 4

| ANALYSIS CONDITIONS | | AVERAGE STRESS COMPONENT | | FIXED POINT (BASE) | | | | | |
|---|---|---|---|---|---|---|---|---|---|
| | | | | AVERAGE STRESS COMPONENT TO BE EDITED | | | | | |
| | | | | σx | σy | σz | τxy | τyz | τzx |
| | STRESS IN EACH AREA | AREA OF INTEREST | | 0.0 | 0.0 | 0.0 | 0.0 | 0.0 | 0.0 |
| | | OTHER THAN AREA OF INTEREST | | 1.0 | 1.0 | 1.0 | 1.0 | 1.0 | 1.0 |

SPRINGBACK ANALYSIS RESULTS

| EVALUATED POINT | POINT Za | SUM OF INFLUENCE QUANTITIES | | AREA 801 | AREA 802 | AREA 803 | AREA 804 | AREA 805 | TOTAL |
|---|---|---|---|---|---|---|---|---|---|
| SPECIFIED NODE(MAXIMUM DISPLACEMENT) (mm) | 26.76 | 32.63 | INFLUENCE QUANTITY(mm) | 0.17 | 0.91 | 15.52 | 14.55 | 1.58 | 32.63 |
| | | | INFLUENCE RATIO(%) | 0.63 | 3.42 | 57.99 | 54.00 | 5.89 | 121.93 |
| | | | | | | | | ERROR (%) | 21.93 |

TABLE 4

CONDITIONS (k = 0.5) AND RESULTS OF ANALYSIS IN EXAMPLE 4

| ANALYSIS CONDITIONS | | AVERAGE STRESS COMPONENT | | FIXED POINT (BASE) | | | | | |
|---|---|---|---|---|---|---|---|---|---|
| | | | | AVERAGE STRESS COMPONENT TO BE EDITED | | | | | |
| | | | | σx | σy | σz | τxy | τyz | τzx |
| | STRESS IN EACH AREA | AREA OF INTEREST | | 0.5 | 0.5 | 0.5 | 0.5 | 0.5 | 0.5 |
| | | OTHER THAN AREA OF INTEREST | | 1.0 | 1.0 | 1.0 | 1.0 | 1.0 | 1.0 |

SPRINGBACK ANALYSIS RESULTS

| EVALUATED POINT | POINT Za | SUM OF INFLUENCE QUANTITIES | | AREA 801 | AREA 802 | AREA 803 | AREA 804 | AREA 805 | TOTAL |
|---|---|---|---|---|---|---|---|---|---|
| SPECIFIED NODE(MAXIMUM DISPLACEMENT) (mm) | 26.76 | 27.5 | DIFFERENCE(deg) | -0.32 | 0.25 | 6.66 | 6.64 | 0.52 | |
| | | | INFLUENCE QUANTITY(mm) | -0.63 | 0.50 | 13.31 | 13.28 | 1.04 | 27.50 |
| | | | INFLUENCE RATIO(%) | -2.37 | 1.88 | 49.76 | 49.63 | 3.88 | 102.78 |
| | | | | | | | | ERROR (%) | 2.78 |

Example 5

An Example in which all Bending Moment Stress Component were Multiplied by the Coefficient 0.5

Figure 11A:
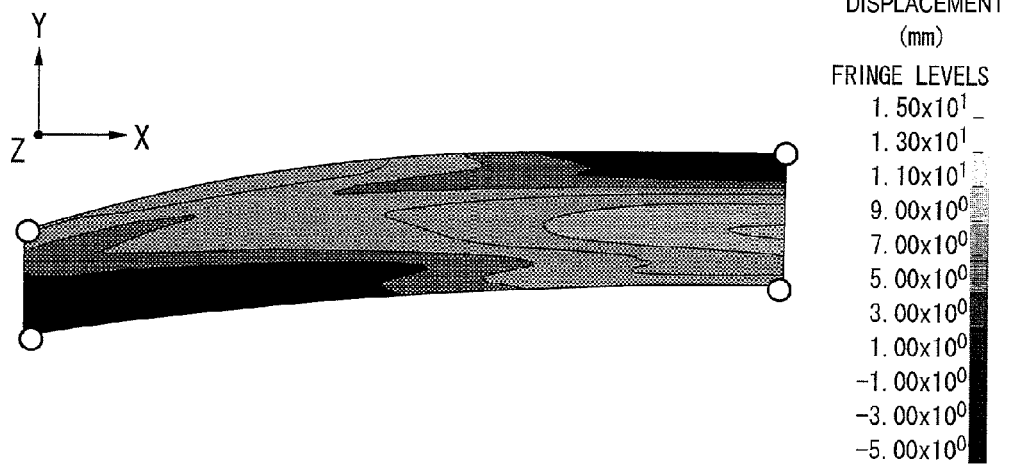
FIG. 11A illustrates a configuration of a press-formed product in Example 5.
Figure 11B:
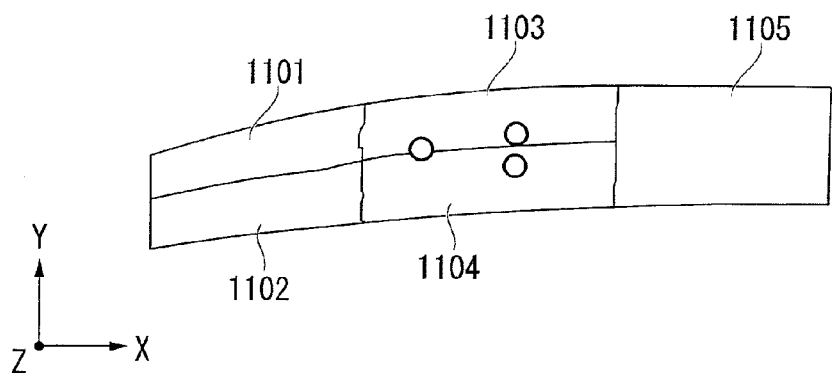
FIG. 11B illustrates divided areas and fixed points of the press-formed product in Example 5.
Figure 11C:
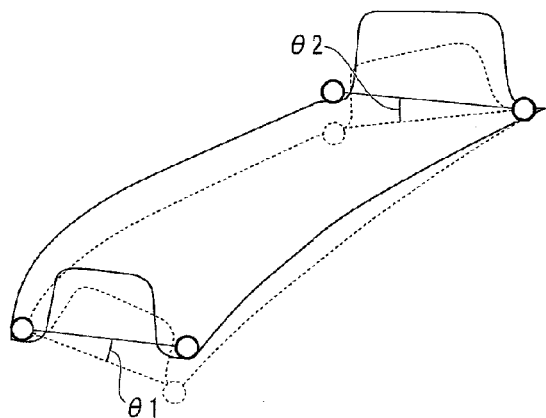
FIG. 11C illustrates a torsional angle about X-axis relating to the press-formed product in Example 5.

In Example 5, influence of the bending moment component (i.e., the deviator stress component) was analyzed with respect to the torsional angle about the X-axis at an end portion of the press-formed product illustrated in FIG. 11A was analyzed. First, individual decomposition forming data which had only the bending moment component was created from the original data. The data was divided into five areas: areas 1101 to 1105 as illustrated in FIG. 11B. The degree of influence with respect to the relative torsional angle of all bending moment components in each area was evaluated. The torsional angle about X-axis θ in the press-formed product of Example 5 is the sum of θ1 and θ2 illustrated in FIG. 11C. The coefficient k herein was 0. In this evaluation, as illustrated in Table 5, the springback amount (i.e., the amount of relative torsion) of the individual decomposition forming data was 4.48 degrees. The springback amount was 3.75 degrees with the moment force component of, for example, the area 1101 being set to zero. The degree of influence was 0.74 degrees which was obtained by multiplying the difference 0.74 degrees by the reciprocal of (1−k), i.e., 1/(1−0)=1. The thus-obtained total influence of the relative torsional angle from the area 1101 to the area 1105 was 4.19 degrees and the error was −6.60%.

Evaluation was made with the coefficient k being 0.5 as shown in Table 6. As a result of evaluation, the springback amount obtained by, for example, multiplying the moment component of the area 1101 by 0.5 was 4.09 degrees. The degree of influence was −0.78 degrees which was obtained by multiplying −0.39 degrees which is the difference from the springback amount of individual decomposition forming data 4.48, by the reciprocal of (1−k), i.e., 1,/(1−0.5)=2.0. The sum of the influence quantities with respect to the torsional angle of each area obtained similarly was 4.40 degrees and the error was reduced from −6.60% to −1.81%. The result in Table 6 shows that the area 1103 has the largest influence with respect to the occurrence of torsion.

TABLE 5

CONDITIONS (k = 0) AND RESULTS OF ANALYSIS IN EXAMPLE 5

| ANALYSIS CONDITIONS | | DEVIATOR STRESS COMPONENT | | FIXED POINT (BASE) | | | | |
|---|---|---|---|---|---|---|---|---|
| | | | | AVERAGE STRESS COMPONENT TO BE EDITED | | | | |
| | | | | $\sigma x$ | $\sigma y$ | $\sigma z$ | $\tau xy$ | $\tau yz$ | $\tau zx$ |
| | STRESS IN EACH AREA | AREA OF INTEREST | 0.0 | 0.0 | 0.0 | 0.0 | 0.0 | 0.0 |
| | | OTHER THAN AREA OF INTEREST | 1.0 | 1.0 | 1.0 | 1.0 | 1.0 | 1.0 |

SPRINGBACK ANALYSIS RESULTS

| EVALUATED POINT | θ | SUM OF INFLUENCE QUANTITIES | | AREA 1101 | AREA 1102 | AREA 1103 | AREA 1104 | AREA 1105 | TOTAL |
|---|---|---|---|---|---|---|---|---|---|
| RELATIVE TORSIONAL ANGLE OF 4 NODES(deg) | 4.48 | 4.19 | INFLUENCE QUANTITY(deg) | 0.74 | 1.00 | 1.21 | 0.34 | 0.91 | 4.19 |
| | | | INFLUENCE RATIO(%) | 16.41 | 22.21 | 26.99 | 7.48 | 20.30 | 93.40 |
| | | | | | | | | ERROR (%) | −6.60 |

TABLE 6

CONDITIONS (k = 0.5) AND RESULTS OF ANALYSIS IN EXAMPLE 5

| ANALYSIS CONDITIONS | | DEVIATOR STRESS COMPONENT | | FIXED POINT (BASE) | | | | | |
|---|---|---|---|---|---|---|---|---|---|
| | | | | AVERAGE STRESS COMPONENT TO BE EDITED | | | | | |
| | | | | $\sigma x$ | $\sigma y$ | $\sigma z$ | $\tau xy$ | $\tau yz$ | $\tau zx$ |
| | STRESS IN EACH AREA | AREA OF INTEREST | 0.5 | 0.5 | 0.5 | 0.5 | 0.5 | 0.5 |
| | | OTHER THAN AREA OF INTEREST | 1.0 | 1.0 | 1.0 | 1.0 | 1.0 | 1.0 |

TABLE 6-continued

CONDITIONS (k = 0.5) AND RESULTS OF ANALYSIS IN EXAMPLE 5

SPRINGBACK ANALYSIS RESULTS

| EVALUATED POINT | θ | SUM OF INFLUENCE QUANTITIES | | AREA 1101 | AREA 1102 | AREA 1103 | AREA 1104 | AREA 1105 | TOTAL |
|---|---|---|---|---|---|---|---|---|---|
| RELATIVE TORSIONAL ANGLE OF 4 NODES(deg) | 4.48 | 4.04 | DIFFERENCE(deg) | 0.39 | 0.50 | 0.62 | 0.18 | 0.51 | |
| | | | INFLUENCE QUANTITY*1/0.5 deg | 0.78 | 1.00 | 1.24 | 0.35 | 1.03 | 4.40 |
| | | | INFLUENCE RATIO(%) | 17.40 | 22.30 | 27.68 | 7.90 | 22.90 | 98.19 ERROR −1.81 (%) |

Example 6

An Example in which Evaluation Criteria are Changed

Figure 12A:
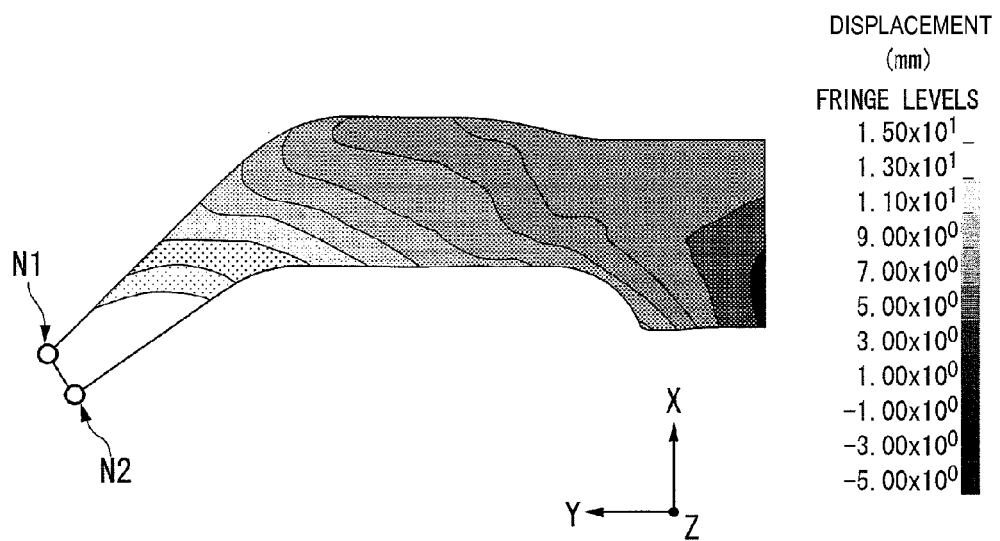
FIG. 12A illustrates a configuration of a press-formed product in Example 6.
Figure 12B:
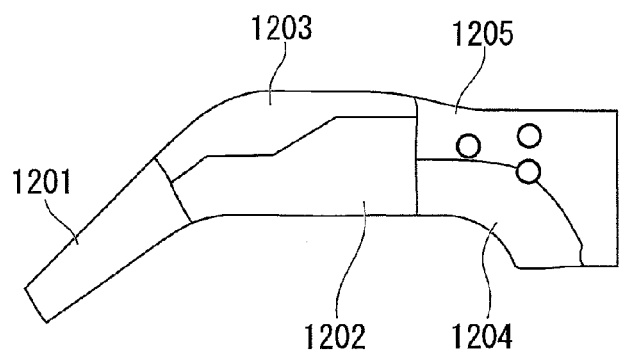
FIG. 12B illustrates divided areas and fixed points of the press-formed product in Example 6.

In Example 6, the press-formed product illustrated in FIG. 12A having the same configuration as that of Example 2 was analyzed on the basis of the individual decomposition data which only had the in-plane stress component generated from the original data. In the analysis, the average value of the displacement of two nodes (points N1 and N2) at an end portion were used as evaluation criteria. The springback amount was calculated with respect to all in-plane stress components using the coefficient k=0 and the average value of displacement of the two nodes (the points N1 and N2) at the end portion illustrated in FIG. 12A was evaluated. FIG. 12B illustrates the divided areas. The calculation result is shown in Table 7.

Example 7

An Example in which Evaluation Criteria are Changed

Figure 13A:
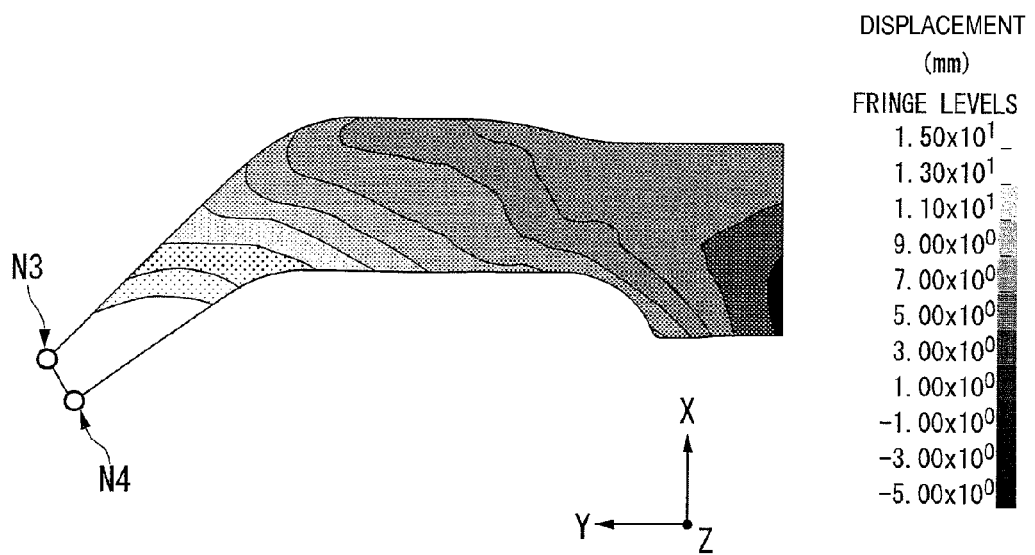
FIG. 13A illustrates a configuration of a press-formed product in Example 7.
Figure 13B:
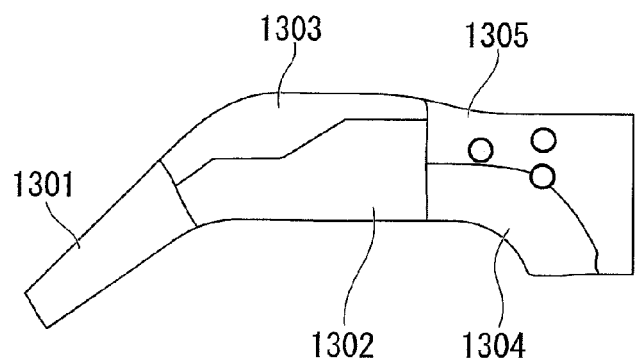
FIG. 13B illustrates divided areas and fixed points of the press-formed product in Example 7.

In Example 7, regarding the press-formed product illustrated in FIG. 13A, relative displacement of displacement of two nodes (points N3 and N4) at an end portion of OLE_LINK1 was employed as an evaluation criterion based on individual decomposition data which only had the in-plane stress component generated from OLE_LINK1 original data. The springback amount was calculated with all in-plane stress component being 0 and the relative displacement between the two nodes (the points N3 and N4) (i.e., difference between the points N3 and N4) at the end portion illustrated in FIG. 13A was evaluated. FIG. 13B illustrates the divided areas. The calculation result is shown in Table 8.

TABLE 7

CONDITIONS AND RESULTS OF ANALYSIS IN EXAMPLE 6

| ANALYSIS CONDITIONS | | | AVERAGE STRESS COMPONENT | | | | FIXED POINT (BASE) | | | |
|---|---|---|---|---|---|---|---|---|---|---|
| SET AREA STRESS TO 0 | | | | | AVERAGE STRESS COMPONENT TO BE EDITED | | | | | |
| | | | | σx | σy | σz | τxy | τyz | τzx | |
| | | STRESS IN EACH AREA | AREA OF INTEREST | 0.0 | 0.0 | 0.0 | 0.0 | 0.0 | 0.0 | |
| | | | OTHER THAN AREA OF INTEREST | 1.0 | 1.0 | 1.0 | 1.0 | 1.0 | 1.0 | |

SPRINGBACK ANALYSIS RESULTS

| EVALUATED POINT | END PORTION | SUM OF INFLUENCE QUANTITIES | | AREA 1201 | AREA 1202 | AREA 1203 | AREA 1204 | AREA 1205 | TOTAL |
|---|---|---|---|---|---|---|---|---|---|
| AVERAGE VALUE OF DISPLACEMENT OF 2 NODES(mm) | 22.15 | 27.33 | INFLUENCE QUANTITY(mm) | −1.30 | −0.72 | 13.40 | 13.63 | 2.32 | 27.33 |
| | | | INFLUENCE RATIO(%) | −5.85 | −3.24 | 60.48 | 61.53 | 10.48 | 123.39 |

TABLE 8

CONDITIONS AND RESULTS OF ANALYSIS IN EXAMPLE 7

| ANALYSIS CONDITIONS | | | AVERAGE STRESS COMPONENT | | | | | FIXED POINT (BASE) | | |
|---|---|---|---|---|---|---|---|---|---|---|
| | | | | AVERAGE STRESS COMPONENT TO BE EDITED | | | | | | |
| | | | | $\sigma x$ | $\sigma y$ | $\sigma z$ | $\tau xy$ | $\tau yz$ | $\tau zx$ | |
| | | STRESS IN EACH AREA | AREA OF INTEREST | 0.0 | 0.0 | 0.0 | 0.0 | 0.0 | 0.0 | |
| | | | OTHER THAN AREA OF INTEREST | 1.0 | 1.0 | 1.0 | 1.0 | 1.0 | 1.0 | |
| SPRINGBACK ANALYSIS RESULTS | | | | | | | | | | |
| EVALUATED POINT | END PORTION | SUM OF INFLUENCE QUANTITIES | | AREA 1301 | AREA 1302 | AREA 1303 | AREA 1304 | AREA 1305 | TOTAL | |
| RELATIVE DISPLACEMENT OF 2 NODES(mm) | 9.21 | 10.59 | INFLUENCE QUANTITY(mm) | 2.94 | 3.26 | 4.24 | 1.64 | −1.49 | 10.59 | |
| | | | INFLUENCE RATIO(%) | 31.88 | 35.41 | 46.02 | 17.79 | −16.19 | 114.90 | |

Example 8

An Example in which Evaluation Criteria are Changed

Figure 14A:
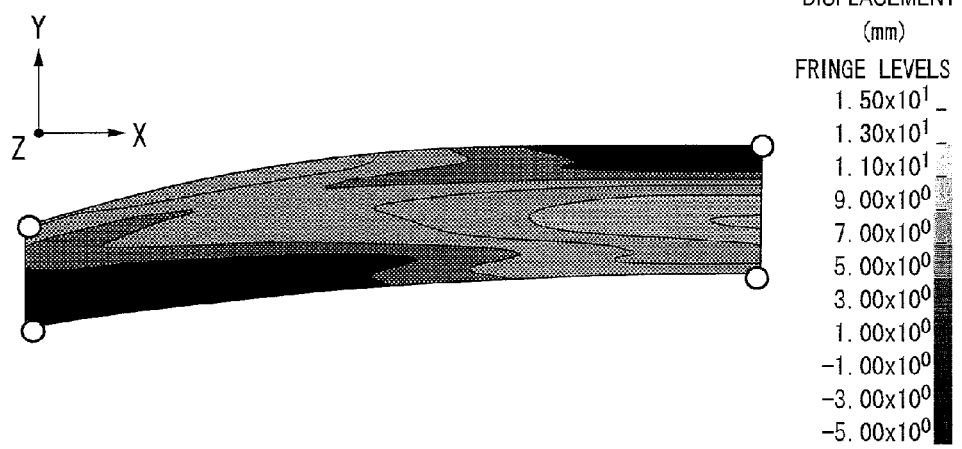
FIG. 14A illustrates a configuration of a press-formed product in Example 8.
Figure 14B:
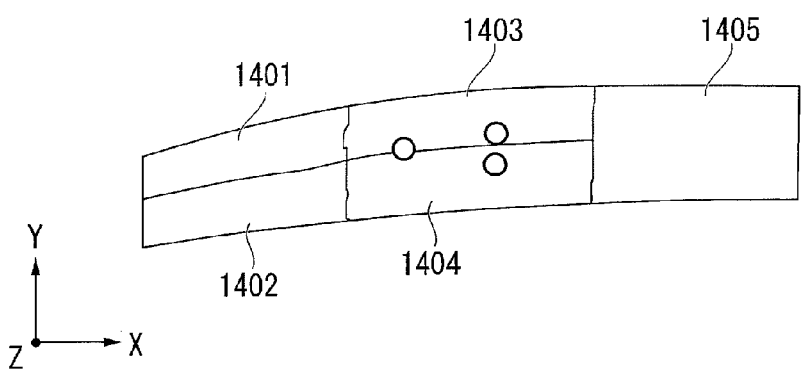
FIG. 14B illustrates divided areas and fixed points of the press-formed product in Example 8.
Figure 14C:
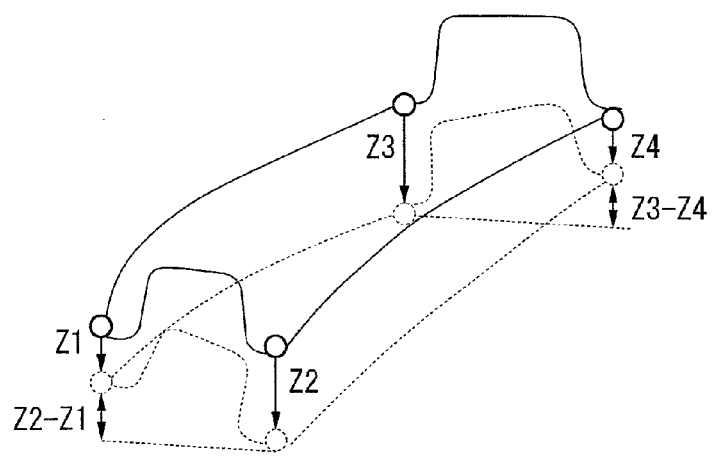
FIG. 14C illustrates relative displacement (i.e., torsion) of four nodes relating to the press-formed product in Example 5.

In Example 8, regarding the press-formed product illustrated in FIG. 14A, influence of the bending moment component (i.e., the deviator stress component) was analyzed with respect to the relative displacement about the X-axis on the basis of the individual decomposition data which only had the moment stress component generated from the original data. The fixed points were set to a central portion of the press-formed product as illustrated in FIG. 14B. Then, as illustrated in FIG. 14C, displacement in the direction of the Z-axis was calculated with respect to the four points Z1, Z2, Z3 and Z4 at the ends and $\Delta=(Z2-Z1)+(Z3-Z4)$ was evaluated as relative displacement about the X-axis at the four nodes. The calculation result is shown in Table 9. As described above, various evaluation criteria can be employed in the present invention.

TABLE 9

CONDITIONS AND RESULTS OF ANALYSIS IN EXAMPLE 8

| ANALYSIS CONDITIONS | | | DEVIATOR STRESS COMPONENT | | | | | FIXED POINT (BASE) | | |
|---|---|---|---|---|---|---|---|---|---|---|
| SET AREA STRESS TO 0 | | | | AVERAGE STRESS COMPONENT TO BE EDITED | | | | | | |
| | | | | $\sigma x$ | $\sigma y$ | $\sigma z$ | $\tau xy$ | $\tau yz$ | $\tau zx$ | |
| | | STRESS IN EACH AREA | AREA OF INTEREST | 0.0 | 0.0 | 0.0 | 0.0 | 0.0 | 0.0 | |
| | | | OTHER THAN AREA OF INTEREST | 1.0 | 1.0 | 1.0 | 1.0 | 1.0 | 1.0 | |
| SPRINGBACK ANALYSIS RESULTS | | | | | | | | | | |
| EVALUATED POINT | $\Delta$ | SUM OF INFLUENCE QUANTITIES | | AREA 1401 | AREA 1402 | AREA 1403 | AREA 1404 | AREA 1405 | TOTAL | |
| RELATIVE DISPLACEMENT OF 4 NODES(deg) | 5.29 | 4.82 | DIFFERENCE(deg) | 0.81 | 1.14 | 1.57 | 0.32 | 0.98 | 4.82 | |
| | | | INFLUENCE RATIO(%) | 15.24 | 21.58 | 29.69 | 5.97 | 18.48 | 90.96 | |

Example 9

Figure 15A:
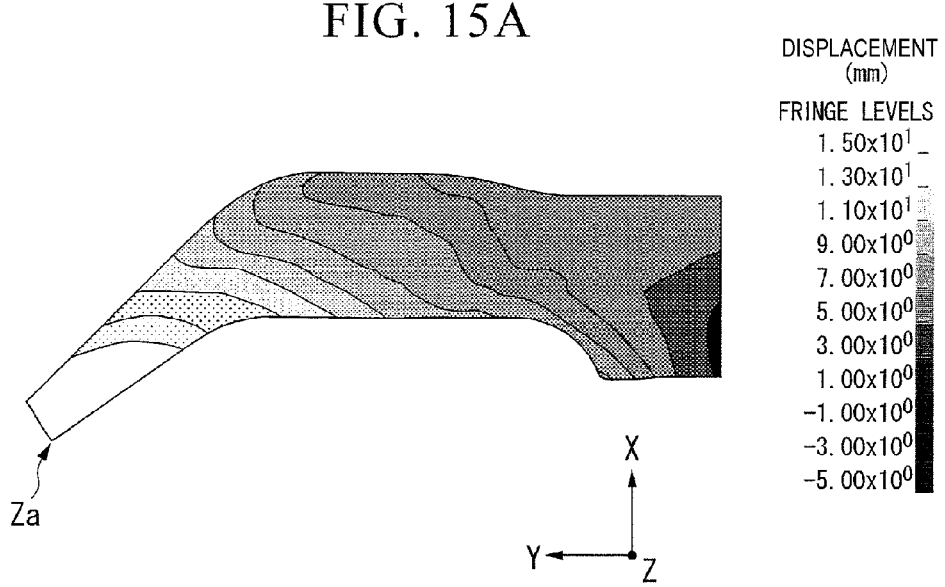
FIG. 15A illustrates a configuration of a press-formed product in Example 9.
Figure 15B:
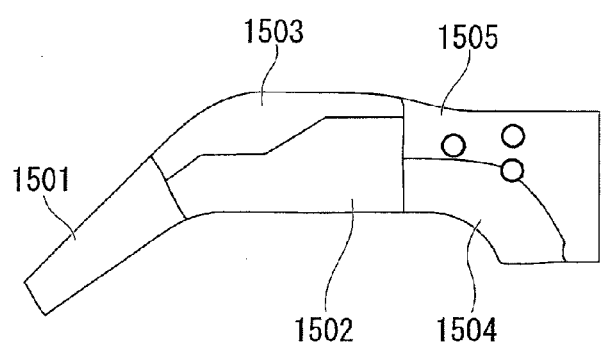
FIG. 15B illustrates divided areas and fixed points of the press-formed product in Example 9.
Figure 16A:
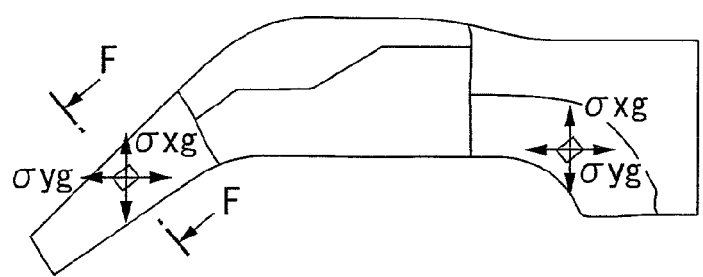
FIG. 16A illustrates a global coordinate system of the press-formed product in Example 9.
Figure 16B:
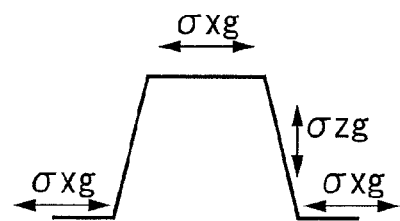
FIG. 16B is a cross-sectional view of FIG. 16A taken along line F-F.
Figure 17A:
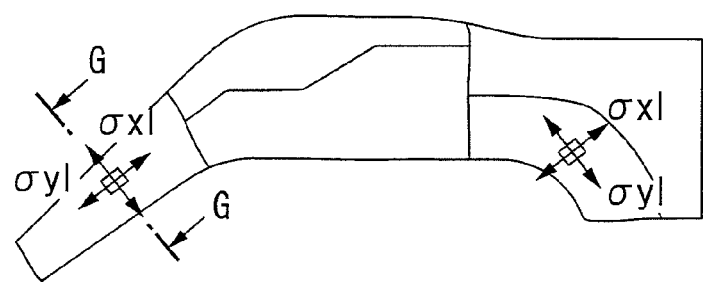
FIG. 17A illustrates a local coordinate system of the press-formed product in Example 9.
Figure 17B:
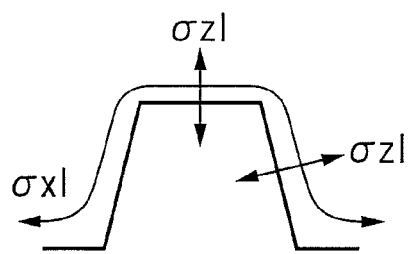
FIG. 17B is a cross-sectional view of FIG. 17A taken along line G-G.

An Example in which Evaluation was Made with Global Coordinate System being Converted into a Local Coordinate System In Example 9, the springback analysis was performed with respect to the press-formed product illustrated in FIG. 15A. In Example 9, evaluation was made with a global coordinate system illustrated in FIG. 16A being converted into a local coordinate system illustrated in FIG. 17A. FIG. 16B is a cross-sectional view of FIG. 16A taken along line F-F and FIG. 17B is a cross-sectional view of FIG. 17A taken along line G-G. Only σy1 in the local coordinate system converted from the global coordinate system on the basis of the individual decomposition data having only the in-plane stress component generated from the original data was multiplied by 0.5. No calculation was performed to other stress components (i.e., the coefficient k=1). Maximum displacement of a section Za illustrated in FIG. 15A was used as an evaluation criterion. The result of the springback analysis performed on the basis of the thus-obtained operation stress is shown in Table 10.

TABLE 10

| CONDITIONS AND RESULTS OF ANALYSIS IN EXAMPLE 9 ||||||||||||
| --- | --- | --- | --- | --- | --- | --- | --- | --- | --- | --- | --- |
| ANALYSIS CONDITIONS | | | AVERAGE STRESS COMPONENT | | | | | | FIXED POINT (BASE) | | |
| | | | AVERAGE STRESS COMPONENT TO BE EDITED | | | | | | | | |
| | | | σxl | σyl | σzl | τxlyl | τylzl | τzlxl | | | |
| | | STRESS IN EACH AREA | AREA OF INTEREST | 1.0 | 0.5 | 1.0 | 1.0 | 1.0 | 1.0 | | | |
| | | | OTHER THAN AREA OF INTEREST | 1.0 | 1.0 | 1.0 | 1.0 | 1.0 | 1.0 | | | |
| SPRINGBACK ANALYSIS RESULTS ||||||||||||
| EVALUATED POINT | AVERAGE BASE | SUM OF INFLUENCE QUANTITIES | | | AREA 1501 | AREA 1502 | AREA 1503 | AREA 1504 | AREA 1505 | TOTAL | |
| SPECIFIED NODE(MAXIMUM DISPLACEMENT) *DISPLACEMENT IN Z DIRECTION (GLOBAL COORDINATE SYSTEM) (mm) | 26.76 | 27.90 | DIFFERENCE(deg) | | −0.32 | 0.26 | 6.75 | 6.74 | 0.53 | | |
| | | | INFLUENCE QUANTITY*1/0.5 deg | | −0.64 | 0.51 | 13.51 | 13.51 | 1.05 | 27.90 | |
| | | | INFLUENCE RATIO(%) | | −2.41 | 1.91 | 50.48 | 50.35 | 3.94 | 104.27 | |
| | | | | | | | | | ERROR (%) | 4.27 | |

INDUSTRIAL APPLICABILITY

According to an embodiment of the present invention, the cause of springback can be accurately analyzed and the time needed to determine a forming process for a formed product can be reduced.

EXPLANATIONS FOR THE REFERENCE SYMBOLS

1: Springback cause analysis device
2: Forming condition input section
3: Press forming analysis section
4: Decomposition forming data generating section
5: Area division and calculation section
6: Springback analysis section
7: Degree of influence calculating section
8: Display section
9: Fixing condition changing section
10: Program
11: CPU
12: Memory
13: Display device
14: Input device
15: Hard disk
16: External storage device
17: NIC (Network Interface Card)
18: Printer
S: Storage section

The invention claimed is:

1. A method of analyzing a cause of springback, comprising:

performing a forming analysis through a numerical simulation based on a forming condition of a plastically formed product so as to calculate forming data of the formed product;

decomposing, on an entire surface of the formed product, stress data included in the forming data of the formed product into an in-plane stress component and a bending moment component with respect to at least one directional component of directional components of the stress;

generating, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component;

performing a calculation by multiplying at least one directional component of stress in the before-calculation individual decomposition forming data regarding each of areas divided from the formed product by a coefficient k in a range of −2≤k≤2, so as to generate an after-calculation individual decomposition forming data;

analyzing a first springback configuration obtained through a numerical simulation with respect to the before-calculation individual decomposition forming data and a second springback configuration obtained through a numerical simulation with respect to the after-calculation individual decomposition forming data;

obtaining a degree of influence of a stress in each of the areas with respect to a springback deformation, calculated based on a before-springback configuration of the formed product included in the forming data, the first springback configuration, and the second springback configuration; and displaying the degree of influence with respect to the springback deformation calculated for each area.

2. The method of analyzing a cause of springback according to claim 1, wherein:

the performing of the forming analysis is executed through numerical simulation by a finite element method using multiple elements;

an average stress in a plate thickness direction of each directional component for each element in the forming data of the formed product is used as the in-plane stress component of the directional component; and a value obtained by subtracting the average of the in-plane stress from each of the directional components of the stress value for all of the integration points which arises for each element is used as the bending moment component of the directional component.

3. The method of analyzing a cause of springback according to claim 1, wherein the range of the coefficient k is 0≤k≤1.

4. The method of analyzing a cause of springback according to claim 1, wherein the range of the coefficient k is 0.5≤k≤0.95.

5. The method of analyzing a cause of springback according to claim 1, wherein the formed product is a press-formed product.

6. A springback cause analysis device, comprising:

a forming analysis means that performs a forming analysis through a numerical simulation based on a forming condition of a plastically formed product so as to calculate forming data of the formed product;

a decomposing means that decomposes, on an entire surface of the formed product, stress data included in the forming data of the formed product into an in-plane stress component and a bending moment component with respect to at least one directional component of directional components of the stress;

a before-calculation individual decomposition forming data generating means that generates, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component;

a calculation means that performs a calculation by multiplying at least one directional component of stress in the before-calculation individual decomposition forming data regarding each of areas divided from the formed product by a coefficient k in a range of −2≤k≤2, so as to generate an after-calculation individual decomposition forming data;

a springback analyzing means that analyzes a first springback configuration obtained through a numerical simulation with respect to the before-calculation individual decomposition forming data and a second springback configuration obtained through a numerical simulation with respect to the after-calculation individual decomposition forming data;

an influence obtaining means that obtains a degree of influence of a stress in each of the areas with respect to a springback deformation, calculated based on a before-springback configuration of the formed product included in the forming data, the first springback configuration, and the second springback configuration; and a display means that displays the degree of influence with respect to the springback deformation calculated for each area.

7. The springback cause analysis device according to claim 6, wherein the display means displays the degree of influence with respect to the springback deformation calculated for each of the areas as a contour display.

8. A non-transitory computer-readable recording medium having a program for analyzing a cause of springback, the program:

performing a forming analysis through a numerical simulation based on a forming condition of a plastically formed product so as to calculate forming data of the formed product;

decomposing, on an entire surface of the formed product, stress data included in the forming data of the formed product into an in-plane stress component and a bending moment component with respect to at least one directional component of directional components of the stress;

generating, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component;

performing a calculation by multiplying at least one directional component of stress in the before-calculation individual decomposition forming data regarding each of areas divided from the formed product by a coefficient k in a range of −2≤k≤2, so as to generate an after-calculation individual decomposition forming data;

analyzing a first springback configuration obtained through a numerical simulation with respect to the before-calculation individual decomposition forming data and a second springback configuration obtained through a numerical simulation with respect to the after-calculation individual decomposition forming data;

obtaining a degree of influence of a stress in each of the areas with respect to a springback deformation, calculated based on a before-springback configuration of the formed product included in the forming data, the first springback configuration, and the second springback configuration; and displaying the degree of influence with respect to the springback deformation calculated for each area.

9. A non-transitory computer readable medium having a program according to claim 8, wherein:

the performing of the analysis is executed through numerical simulation by a finite element method using multiple elements;

an average stress in a plate thickness direction of each directional component for each element in the forming data of the formed product is used as an in-plane stress component of the directional component; and a value obtained by subtracting average of the in-plane stress from each of the directional components of the stress value for all of the integration points for each element is used as a bending moment component of the directional component.

10. A method of analyzing a cause of springback, comprising:

performing a forming analysis through a numerical simulation based on a forming condition of a plastically formed product so as to calculate forming data of the formed product;

decomposing, on an entire surface of the formed product, stress data included in the forming data of the formed product into an in-plane stress component and a bending moment component with respect to at least one directional component of directional components of the stress;

generating, from the forming data of the formed product, an individual decomposition data including at least one of a first individual decomposition data and a second individual decomposition data as a before-calculation individual decomposition data, the first individual decomposition data having only an in-plane stress component regarding the stress of the decomposed directional component, the second individual decomposition data having only a bending moment component regarding a stress of the decomposed directional component;

performing a calculation by multiplying at least one directional component of stress in the before-calculation individual decomposition forming data regarding each of areas divided from the formed product by a coefficient k in a range of $-2 \leq k \leq 2$, so as to generate an after-calculation individual decomposition forming data;

analyzing a springback configuration obtained through a numerical simulation with respect to the after-calculation individual decomposition forming data;

obtaining a degree of influence of a stress in each of the areas with respect to a springback deformation calculated based on a before-springback configuration of the formed product included in the forming data and the springback configuration; and displaying the degree of influence with respect to the springback deformation calculated for each area.

* * * * *